United States Patent
Kim et al.

(10) Patent No.: US 12,456,991 B2
(45) Date of Patent: Oct. 28, 2025

(54) ELECTRONIC DEVICE AND METHOD FOR CONTROLLING TRANSMISSION POWER OF COMMUNICATION MODULE

(71) Applicant: Samsung Electronics Co., Ltd., Suwon-si (KR)

(72) Inventors: Hyeongwoo Kim, Suwon-si (KR); Sangjin Oh, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 18/350,261

(22) Filed: Jul. 11, 2023

(65) Prior Publication Data

US 2023/0353172 A1    Nov. 2, 2023

Related U.S. Application Data

(63) Continuation of application No. PCT/KR2022/000159, filed on Jan. 5, 2022.

(30) Foreign Application Priority Data

Feb. 1, 2021  (KR) .................. 10-2021-0014069

(51) Int. Cl.
*H04B 1/00* (2006.01)
*G01V 3/08* (2006.01)
*H04W 52/28* (2009.01)

(52) U.S. Cl.
CPC ........... *H04B 1/0064* (2013.01); *G01V 3/088* (2013.01); *H04W 52/285* (2013.01)

(58) Field of Classification Search
CPC . G01V 3/088; H01Q 9/04; H01Q 9/40; H04B 1/0064; H04B 1/3827;

(Continued)

(56) References Cited

U.S. PATENT DOCUMENTS 8,620,245 B2    12/2013    Chung et al.
10,340,592 B2   7/2019     Nam et al.
(Continued)

FOREIGN PATENT DOCUMENTS

CN    106130589 A    11/2016
CN    113556802 A    10/2021
(Continued)

OTHER PUBLICATIONS

International Search Report with Written Opinion and English translation dated Apr. 11, 2022; International Appln. No. PCT/KR2022/000159.

(Continued)

*Primary Examiner* — Nguyen T Vo
(74) *Attorney, Agent, or Firm* — Jefferson IP Law, LLP

(57) ABSTRACT

An electronic device is provided. The electronic device includes a first antenna which transmits/receives a radio frequency (RF) signal, a second antenna which transmits/receives an RF signal, a third antenna which transmits/receives an RF signal, a first grip sensor sensing a proximity of an external dielectric body, a second grip sensor sensing a proximity of an external dielectric body, a third grip sensor sensing a proximity of an external dielectric body, and a processor operatively connected to the first grip sensor, the second grip sensor, and the third grip sensor, wherein upon sensing proximity of an external dielectric body, the first grip sensor, the second grip sensor, and the third grip sensor transmit proximity information to the processor, and upon receiving proximity information from the second grip sensor and the third grip sensor, the processor determines that an external dielectric body is in proximity to the first grip sensor.

20 Claims, 20 Drawing Sheets

(58) Field of Classification Search
CPC ........ H04B 1/3838; H04B 1/50; H04B 17/12; H04W 52/28; H04W 52/285
See application file for complete search history.

(56) References Cited

U.S. PATENT DOCUMENTS

| | | |
|---|---|---|
| 11,552,392 B2 | 1/2023 | Jung et al. |
| 2009/0305742 A1 | 12/2009 | Caballero et al. |
| 2011/0250928 A1 | 10/2011 | Schlub et al. |
| 2012/0077538 A1 | 3/2012 | Yun |
| 2012/0258772 A1* | 10/2012 | Brogle .................. H01Q 21/28 455/556.1 |
| 2012/0315851 A1* | 12/2012 | Park ..................... H04B 7/0814 455/575.7 |
| 2012/0322378 A1 | 12/2012 | Tai |
| 2016/0276738 A1 | 9/2016 | Chen et al. |
| 2016/0365886 A1 | 12/2016 | Prendergast et al. |
| 2018/0149735 A1 | 5/2018 | Lim et al. |
| 2020/0365969 A1* | 11/2020 | Lee ........................ H01Q 21/06 |
| 2020/0365987 A1* | 11/2020 | Kim ........................ H01Q 3/24 |
| 2022/0006181 A1 | 1/2022 | Yohsikawa |

FOREIGN PATENT DOCUMENTS

| | | |
|---|---|---|
| EP | 2 509 229 B1 | 2/2015 |
| JP | 2002-252515 A | 9/2002 |
| JP | 2007-102325 A | 4/2007 |
| JP | 2019-146017 A | 8/2019 |
| JP | 2020-072406 A | 5/2020 |
| JP | 2020-096382 A | 6/2020 |
| KR | 10-2010-0120485 A | 11/2010 |
| KR | 10-2011-0030534 A | 3/2011 |
| KR | 10-2014-0041939 A | 4/2014 |
| KR | 10-2015-0128250 A | 11/2015 |
| KR | 10-2018-0010300 A | 1/2018 |
| KR | 10-2018-0013615 A | 2/2018 |
| KR | 10-2020-0052611 A | 5/2020 |

OTHER PUBLICATIONS

Korean Office Action dated Jul. 21, 2025, issued in Korean Application No. 10-2021-0014069.

* cited by examiner

FIG. 12

|  | PHYSICAL LENGTH OF ANTENNA | GRIP SENSOR RECOGNITION DISTANCE | SUPPORT FREQUENCY | USE PURPOSE |
|---|---|---|---|---|
| FIRST ANTENNA | 5mm | 7mm | 2.5GHz ~ 2.7GHz | SUB6 (n41) |
| SECOND ANTENNA | 25mm | 16mm | 600GHz ~ 2.4GHz | LTE |
| THIRD ANTENNA | 20mm | 14mm | 1.5GHz ~ 2.4GHz | Wifi, GPS |

FIG. 17

| Case | HUMAN BODY PROXIMITY DETECTION | POWER CONTROL OPERATION |
|---|---|---|
| case 1 | Ant2 DETECTION | Not Working |
| case 2 | Ant1 DETECTION | Working |
| case 3 | Ant3 DETECTION | Not Working |
| case 4 | Ant1,2 DETECTION | Working |
| case 5 | Ant2,3 DETECTION | Working |
| case 6 | Ant1,3 DETECTION | Working |
| case 7 | Ant1,2,3 DETECTION | Working |

FIG. 18

| | OPERATION DISTANCE OF GRIP SENSOR | n41 max Pwr[dBm] | SAR [W/Kg] |
|---|---|---|---|
| ALGORITHM IN THE RELATED ART | 7mm | 24 | 1.6 |
| | 7mm | 22.5 | 1.3 |
| ALGORITHM IN THE PRESENT INVENTION | 14mm | 24 | 0.8 |

ELECTRONIC DEVICE AND METHOD FOR CONTROLLING TRANSMISSION POWER OF COMMUNICATION MODULE

CROSS-REFERENCE TO RELATED APPLICATION(S)

This application is a continuation application, claiming priority under § 365(c), of an International application No. PCT/KR2022/000159, filed on Jan. 5, 2022, which is based on and claims the benefit of a Korean patent application number 10-2021-0014069, filed on Feb. 1, 2021, in the Korean Intellectual Property Office, the disclosure of which is incorporated by reference herein in its entirety.

BACKGROUND

1. Field

The disclosure relates to an electronic device. More particularly, the disclosure relates to an electronic device and a method capable of controlling a transmission power of a communication module.

2. Description of Related Art

An electronic device, such as a smart phone, may include a proximity sensor (e.g., capacitance sensor). The proximity sensor may be electrically connected to an antenna included in the electronic device. If current flows through the antenna, an electromagnetic field is formed, and if a dielectric body approaches the electronic device, a change of an electric field (or change of capacitance) may occur. The proximity sensor may generate a trigger signal related to a state where the dielectric body approaches the electronic device based on the change of capacitance acquired through the antenna.

By utilizing this, the portable electronic device may sense a user's approach, and may lower the power of a transmission signal based on an ultrahigh frequency band in response to the user's approach.

The above information is presented as background information only to assist with an understanding of the disclosure. No determination has been made, and no assertion is made, as to whether any of the above might be applicable as prior art with regard to the disclosure.

SUMMARY

An electronic device may identify a state where a user's hand grips the electronic device (e.g., grip state) by using, for example, a proximity sensor (e.g., capacitance sensor or grip sensor) electrically connected to an antenna. The electronic device may include a plurality of proximity sensors so as to be able to identify a position (e.g., grip position) in which the user's hand grips the electronic device.

Further, as the usage of the electronic device is generalized, there is an increased concern and interest in the influence that electromagnetic waves exert on a dielectric body, and thus there is an increased interest in the specific absorption rate (SAR) numerical value representing how much the electromagnetic waves being generated from the electronic device are absorbed in the dielectric body. If SAR regulations are not satisfied when the SAR is measured from the maximum distance in which the grip sensor operates, it may be necessary to make the electronic device relatively get away from a user by reducing the maximum output power of the electronic device or increasing a recognition distance of an antenna. However, if the maximum output power of the electronic device is reduced, the performance of the electronic device may be reduced, and in order to increase the recognition distance of the antenna, the size of the antenna should be physically increased, and this may cause a space for mounting other components of the electronic device not to be secured or cause production costs to be increased.

Aspects of the disclosure are to address at least the above-mentioned problems and/or disadvantages and to provide at least the advantages described below. Accordingly, an aspect of the disclosure is to provide an electronic device that satisfies the SAR regulations of a spaced distance by increasing an operation range of a proximity sensor (e.g., grip sensor) even without increasing the size of an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a first antenna configured to transmit and receive a radio frequency (RF) signal of a first frequency band, a second antenna disposed spaced apart from the first antenna in a first direction, and configured to transmit and receive an RF signal of a second frequency band that is lower than the first frequency band, a third antenna disposed spaced apart from the first antenna in a second direction that is opposite to the first direction, and configured to transmit and receive an RF signal of a third frequency band that is lower than the second frequency band, a first grip sensor configured to detect proximity of an external dielectric body based on a capacitance change of the first antenna, a second grip sensor configured to detect proximity of an external dielectric body based on a capacitance change of the second antenna, a third grip sensor configured to detect proximity of an external dielectric body based on a capacitance change of the third antenna, and a processor operatively connected to the first grip sensor, the second grip sensor, and the third grip sensor, wherein in case of detecting the proximity of the external dielectric body, the first grip sensor, the second grip sensor, and the third grip sensor transmit proximity information to the processor, and wherein the processor is configured to determine that the external dielectric body is in proximity to the first grip sensor in case of receiving the proximity information from the second grip sensor and the third grip sensor.

In accordance with another aspect of the disclosure, a method for controlling a transmission power of an electronic device is provided. The method includes determining proximity of an external dielectric body by using a first grip sensor, a second grip sensor, and a third grip sensor, and controlling a transmission power of the electronic device based on the proximity of the external dielectric body, wherein determining the proximity of the external dielectric body includes determining that the external dielectric body is in proximity to the first grip sensor in case of receiving proximity information from the second grip sensor and the third grip sensor.

According to various embodiments of the disclosure, it is possible to satisfy the SAR regulations without reducing the maximum output power or reducing the performance of the electronic device by increasing a proximity recognition range of a proximity sensor (e.g., grip sensor) in a situation that a recognition distance of the grip sensor is short.

Further, it is possible to prevent a frequent transmission power control by maintaining the optimum transmission power for a long time based on the result of proximity recognition for a plurality of antennas. Through this, it is possible to secure a stable communication performance. Further, it is possible to design an antenna optimized to an RF performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 illustrates the characteristics of an antenna and a grip sensor according to an embodiment of the disclosure;

FIG. 17 is a table in which power control operations of an AP in accordance with detection of human body approach by antennas are arranged according to an embodiment of the disclosure; and FIG. 18 is a table in which effects in accordance with a method for controlling a transmission power of a communication module are arranged according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
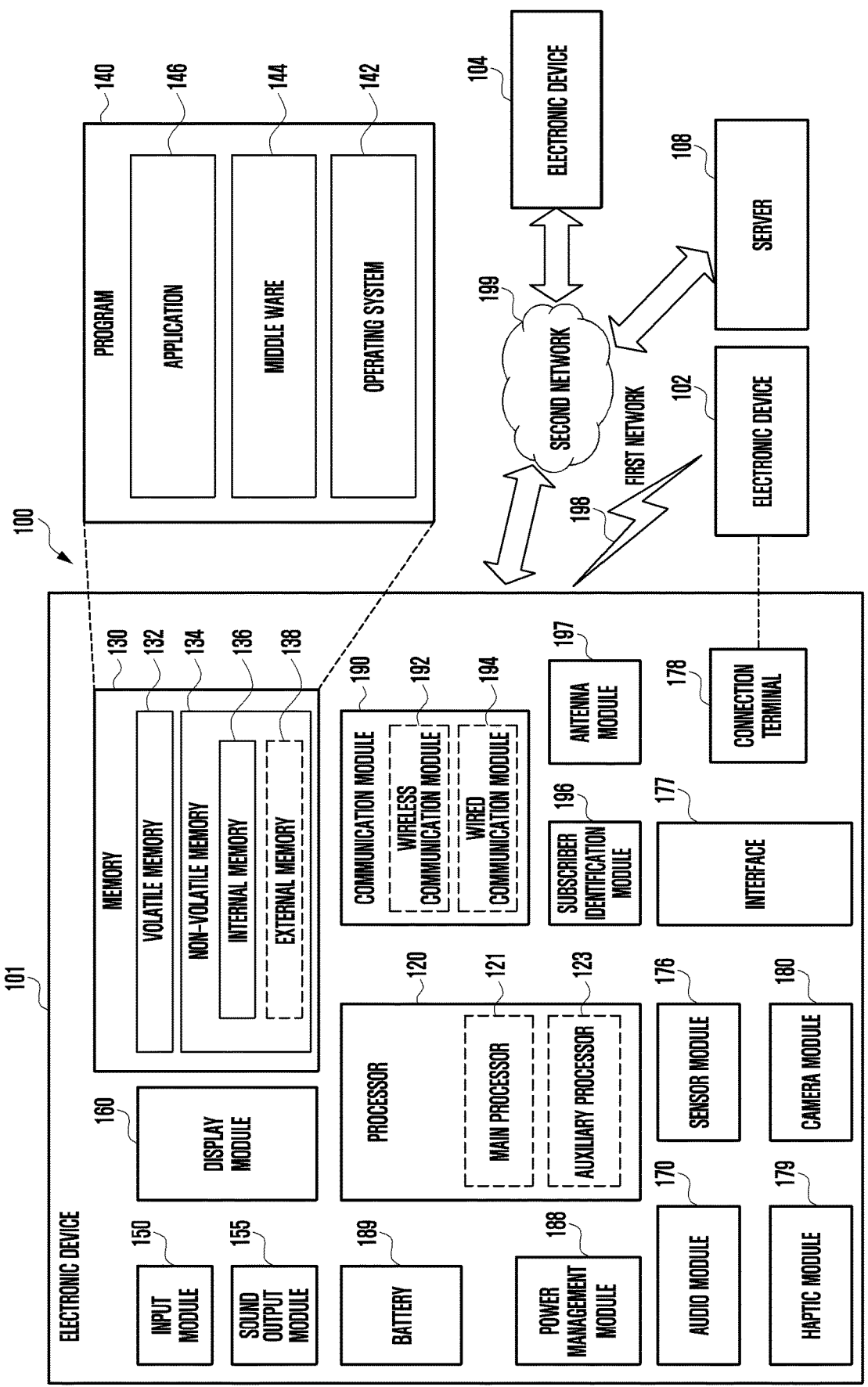
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to a further embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to still another embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to a further embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to still another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to another embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to a further embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to still another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to a further embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to another embodiment, commands or data may be transmitted or received between the electronic device 101 and the electronic device 104 via the server 108 coupled with the second network 199. Each of the electronic devices 102 or 104 may be a device of a same type as, or a different type, from the electronic device 101. According to yet another embodiment, all or some of operations to be executed at the electronic device 101 may be executed at one or more of the electronic device 102, the electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the electronic device 104 may include an internet-of-things (IoT) device. The server 108 may be an intelligent server using machine learning and/or a neural network. According to a further embodiment, the electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to still another embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to another embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
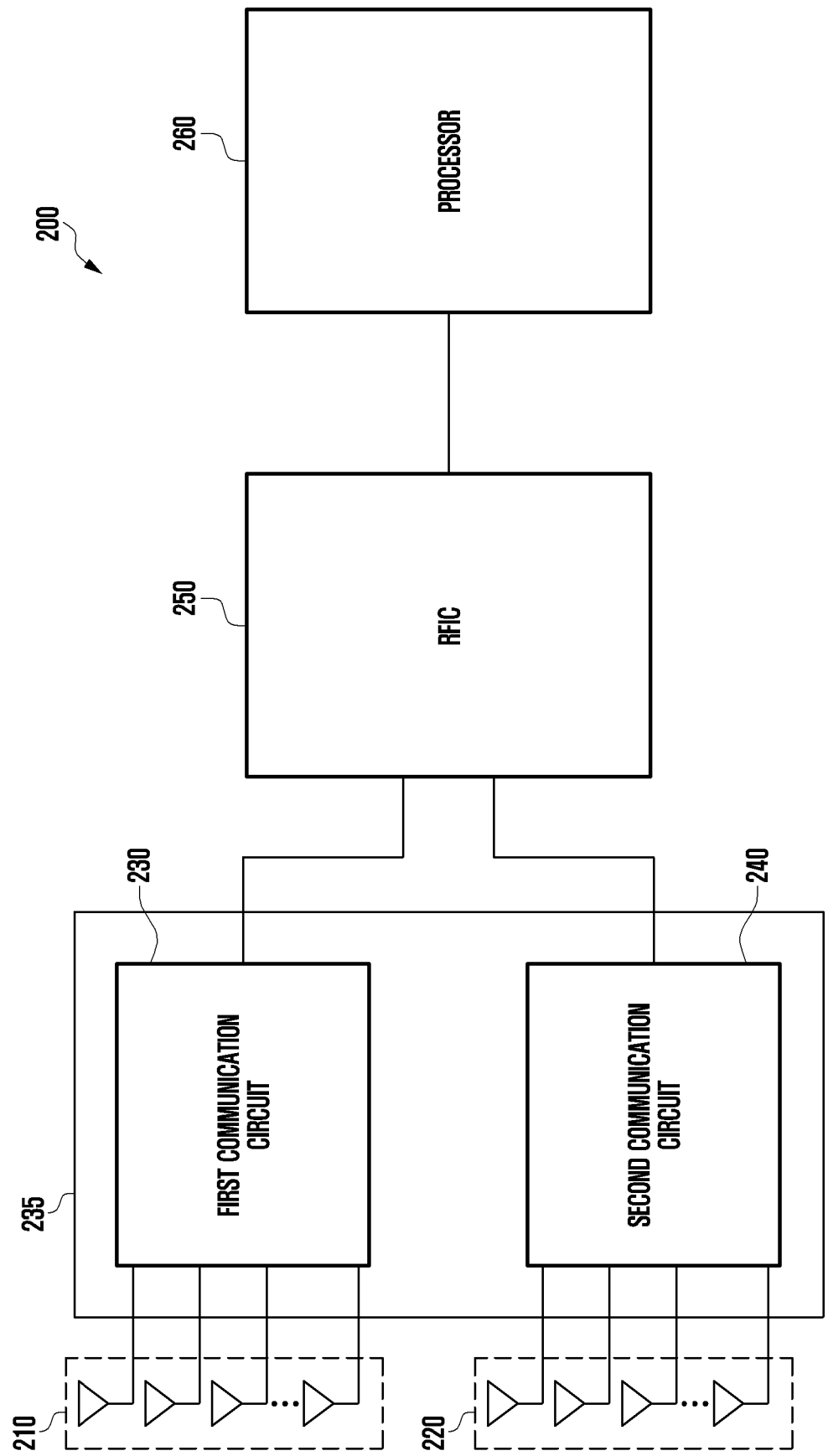
FIG. 2 is a block diagram of a wireless communication module, a power management module, and an antenna module of an electronic device according to an embodiment of the disclosure.

FIG. 2 is a block diagram of a plurality of antennas according to an embodiment of the disclosure.

According to various embodiments, an electronic device 101 may include a communication chipset 200 (e.g., communication module 190 or antenna module 197 of FIG. 1), which may include, for example, a first antenna array 210, a second antenna array 220, a communication circuit 235, a radio frequency integrated circuit (RFIC) 250, and a processor 260 (e.g., processor 120 of FIG. 1 or communication processor (CP)). In a certain embodiment, the RFIC 250 may include a controller (e.g., control circuit including at least one processing circuitry) that can perform at least a partial function of the processor 260.

According to various embodiments, the first antenna array 210 may include one or more first antennas. In various embodiments, the first antennas may be formed on one surface of a printed circuit board (PCB) by using patch antennas. For example, the first antenna array 210 may include a patch antenna array.

According to various embodiments, the second antenna array 220 may include one or more second antennas. In various embodiments, the second antennas may be formed on the other surface (e.g., side surface of the printed circuit board) that is different from the one surface of the printed circuit board by using dipole antennas. For example, the second antenna array 220 may include a dipole antenna array.

According to various embodiments, the communication circuit 235 may be electrically connected to the first antenna array 210 and the second antenna array 220. According to another embodiment, the communication circuit 235 may transmit or receive signals to or from an outside (e.g., base station) through at least one of the first antenna array 210 or the second antenna array 220. According to yet another embodiment, the communication circuit 235 may receive the designated signals (e.g., first signal and second signal) output from the outside through at least one of the first antenna array 210 or the second antenna array 220. According to various embodiments, the communication circuit 235 may be formed to include a first communication circuit 230 and a second communication circuit 240.

According to a further embodiment, the first communication circuit 230 may be electrically connected to the first antenna array 210. According to still another embodiment, the first communication circuit 230 may be electrically connected to the first antenna array 210, and may transmit or receive signals to or from the outside (e.g., base station). According to an embodiment, the first communication circuit 230 may receive the first signal among the designated signals output from the outside through the first antenna array 210.

According to another embodiment, the second communication circuit 240 may be electrically connected to the second antenna array 220. According to yet another embodiment, the second communication circuit 240 may be electrically connected to the second antenna array 220, and may transmit or receive signals to or from the outside (e.g., base station). According to a further embodiment, the second communication circuit 240 may receive the second signal (or second reception signal) among the designated signals output from the outside through the second antenna array 220.

According to various embodiments, the RFIC 250 may process and transmit the signal to the outside (e.g., base station) through the communication circuit 235 (e.g., first communication circuit 230 and second communication circuit 240), and may process the signal (e.g., first signal or second signal) acquired from the outside through the communication circuit 235. According to still another embodiment, the RFIC 250 may include constituent elements related to the signal transmission and reception. According to an embodiment, the RFIC 250 may include a switch (not illustrated) (e.g., Tx/Rx switch) for selecting a path for the signal transmission/reception, an RF transmitter (not illustrated) (e.g., transmitter), and an RF receiver (not illustrated) (e.g., receiver).

According to another embodiment, the switch may be implemented by, for example, a single pole double throw (SPDT) switch. According to yet another embodiment, the switch may function to separate and connect the antenna arrays (e.g., first antenna array 210 and second antenna array 220) to the transmitting end (e.g., transmitter) and the receiving end (e.g., receiver) in a system that operates, for example, in a time division method (e.g., time division duplex (TDD) method).

According to a further embodiment, although not illustrated, the receiver may include a filter, a low noise amplifier (LNA), a mixer, a buffer, or a voltage controlled oscillator (VCO). According to still another embodiment, although not illustrated, the transmitter may include a filter, a power amplifier (PA), a driver, or a VCO.

According to various embodiments, the power amplifier PA may be, for example, a high-efficiency power amplifier adopting a power high-efficiency technology for supporting a millimeter wave, and for example, a Doherty technology, envelope elimination and restoration (EER) technology, a linear amplification using non-linear components (LINC) technology, a Class-S PA technology, or an envelope tracking (ET) technology may be used. According to an embodiment, the low noise amplifier (LNA) may remove a noise of the entire receiver through, for example, low noise matching. According to another embodiment, the filters of the receiving end (e.g., receiver) and the transmitting end (e.g., transmitter) may pass only signal bands (e.g., 28 GHz, 39 GHz, 60 GHz, and the like) required in the system, and may remove other unnecessary frequency signals. For example, the filter may be located in front of the power amplifier (PA) in the transmitting end, and may be located in the rear of the low noise amplifier (LNA) in the receiving end so as to attenuate unnecessary signals.

Figure 3:
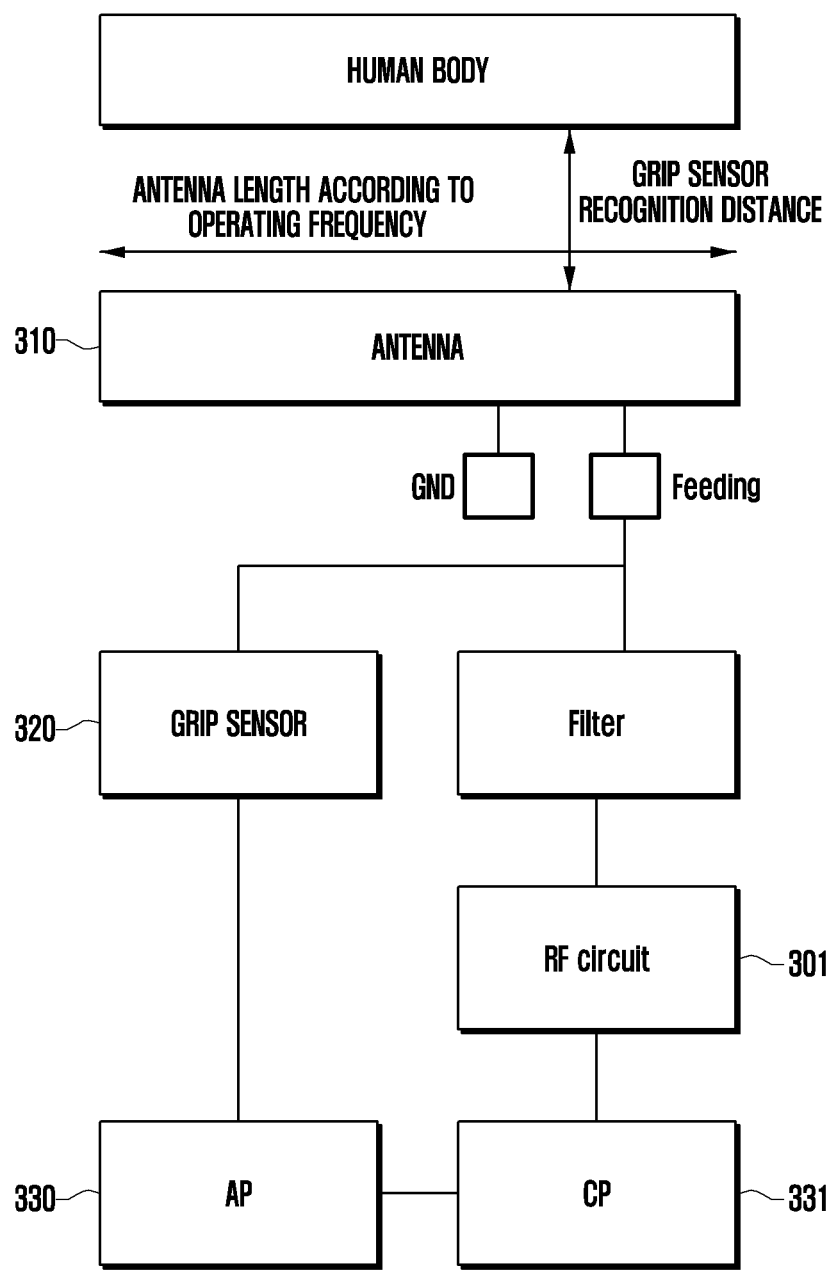
FIG. 3 is an operation structure diagram illustrating a grip sensor of an electronic device according to an embodiment of the disclosure.

FIG. 3 is an operation structure diagram illustrating a grip sensor of an electronic device according to an embodiment of the disclosure.

According to various embodiments, a grip sensor 320 may be electrically/operatively connected to an antenna 310, and may detect an amount of capacitance change of the connected antenna 310. In a state where the electronic device 101 operates, the grip sensor 320 may always detect a dielectric body, and if the amount of capacitance change satisfies a predetermined condition when the dielectric body approaches the grip sensor 320, the grip sensor 320 may send a signal to an AP 330 that controls the electronic device 101. The AP 330 may receive the signal, and discriminate whether the dielectric body is detected, and if the proximity of the dielectric body is determined, the AP 330 may control the transmission power of the antenna 310 through a CP 331.

According to various embodiments, the supported frequency may differ for each antenna 310, and a separate grip sensor 320 may be connected for each antenna 310. The operation range of the grip sensor 320 may differ depending on the physical size of the antenna 310 connected to the grip sensor 320, the kind of the grip sensor 320, an element directly/indirectly connected to the grip sensor 320, and noise characteristics. This will be described together with detailed numerical values with reference to FIG. 10.

According to various embodiments, as the kind and the bandwidth of a radio frequency (RF) being supported in the electronic device 101 is increased, the number of antennas 310 being physically required may also be increased. Further, the antenna 310 that supports a high frequency for utilizing 5G technology may also be separately constituted, and in case of the antenna 310 that supports the high frequency, the physical length thereof may be shortened. This may be explained by the following equation.

Antenna length (wavelength)=Propagation speed (speed of light)/Frequency ($\lambda=c/f$)      Equation 1

Since the length of the antenna 310 is in inverse proportion to the frequency, the physical length of the antenna 310 relatively supporting the high frequency may be shortened. In case of connecting the grip sensor 320 to the antenna 310 having a short physical length, the operation range of the grip sensor 320 may be shortened in proportion to the physical length of the antenna. In this case, difficulty may occur in satisfying the specific absorption rate (SAR) standards. The SAR may be a numerical value representing how much electromagnetic waves being generated in the electronic device are absorbed in the dielectric body, and as the usage of the electronic device is recently generalized, this SAR numerical value may act as an important factor in case that a consumer uses the electronic device.

According to various embodiments, the SAR may be measured in the maximum distance in which the grip sensor 320 operates, and in order to satisfy the SAR standard, the maximum output power of the electronic device 101 may be reduced, or the size of the antenna 310 may be increased. As described above, in order to increase the recognition distance of the grip sensor 320, it may be required to increase the size of the antenna 310. However, if the maximum output power of the electronic device 101 is reduced, the performance of the electronic device 101 may be decreased, and thus the method of increasing the size of the antenna 310 may have physical, structural, and performance limitations in the electronic device 101 that pursues miniaturization and slimming.

Figure 4:
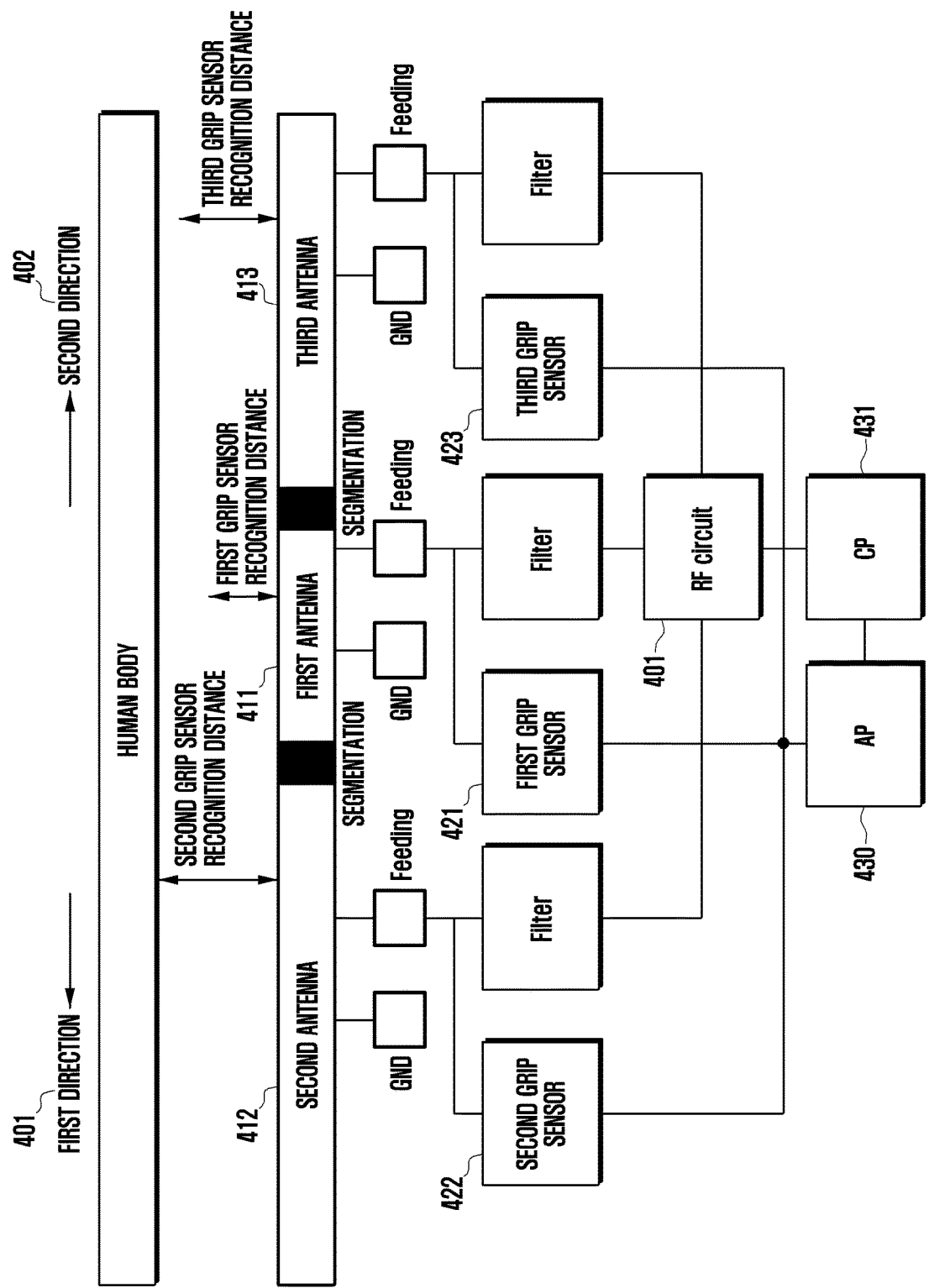
FIG. 4 is a diagram illustrating the constitution of an electronic device according to an embodiment of the disclosure.

FIG. 4 is a diagram illustrating the constitution of an electronic device according to an embodiment of the disclosure.

According to various embodiments, an electronic device 101 may include: a first antenna 411 configured to transmit and receive an RF signal of a first frequency band; a second antenna 412 disposed spaced apart from the first antenna 411 in a first direction (401), and configured to transmit and receive an RF signal of a second frequency band that is lower than the first frequency band; and a third antenna 413 disposed spaced apart from the first antenna 411 in a second direction (402) that is opposite to the first direction (401), and configured to transmit and receive an RF signal of a third frequency band that is lower than the second frequency band. Further, the electronic device 101 may include: a first grip sensor 421 configured to detect proximity of an external dielectric body based on a capacitance change of the first antenna 411; a second grip sensor 422 configured to detect proximity of an external dielectric body based on a capacitance change of the second antenna 412; and a third grip sensor 423 configured to detect proximity of an external dielectric body based on a capacitance change of the third antenna 413, and the electronic device 101 may include an AP 430 operatively connected to the first grip sensor 421, the second grip sensor 422, and the third grip sensor 423.

According to various embodiments, the first frequency band of the first antenna may belong to 2.5 GHz to 2.7 GHz. The second frequency band of the second antenna may belong to 600 MHz to 2.4 GHz. The third frequency band of the third antenna may belong to 1.5 GHz to 2.4 GHz.

According to various embodiments, in case of detecting the proximity of the external dielectric body, the first grip sensor 421, the second grip sensor 422, and the third grip sensor 423 may transmit proximity information to the AP 430. The AP 430 may be configured to determine that the external dielectric body is in proximity to the first grip sensor 421 in case of receiving the proximity information from the second grip sensor 422 and the third grip sensor 423.

According to various embodiments, the electronic device 101 may include the second antenna 412 and the third antenna 413 supporting relatively low frequencies in addition to the first antenna 411 supporting a high frequency. As described above with reference to FIG. 3, the physical length of the first antenna 411 supporting the high frequency may be short, and thus the recognition distance of the first grip sensor 421 connected to the first antenna 411 may also be short.

According to various embodiments, the electronic device 101 may include grip sensors (e.g., first grip sensor 421, second grip sensor 422, and third grip sensor 423) detecting the proximity of the dielectric body through the capacitance change. The first grip sensor 421 may have a relatively short sensor recognition distance as compared with the second grip sensor 422 and the third grip sensor 423. Because of this, even if the dielectric body becomes in proximity thereto, it may be difficult for the first grip sensor 421 to detect the dielectric body. However, the second antenna 412, which is disposed spaced apart from the first antenna 411 in the first direction (401), and transmits/receives an RF signal of the second frequency band that is lower than the first frequency band, may detect the proximity of the dielectric body in a relatively wider range. The second antenna 412 may transfer the proximity information of the dielectric body to the AP 430. In the same manner as the second antenna 412, the third antenna 413 may also detect the proximity of the dielectric body that is unable to be detected by the first antenna 411, and may transfer the proximity information of the dielectric body to the AP 430.

According to various embodiments, the electronic device 101 may include the first antenna 411, the second antenna 412, and the third antenna 413. The first antenna 411, the second antenna 412, and the third antenna 413 may be physically/electrically connected to one another by segmentation. The electronic device 101 may include a structure in which the plurality of antennas (e.g., the first antenna 411, the second antenna 412, and the third antenna 413) are combined with one another.

Figure 15:
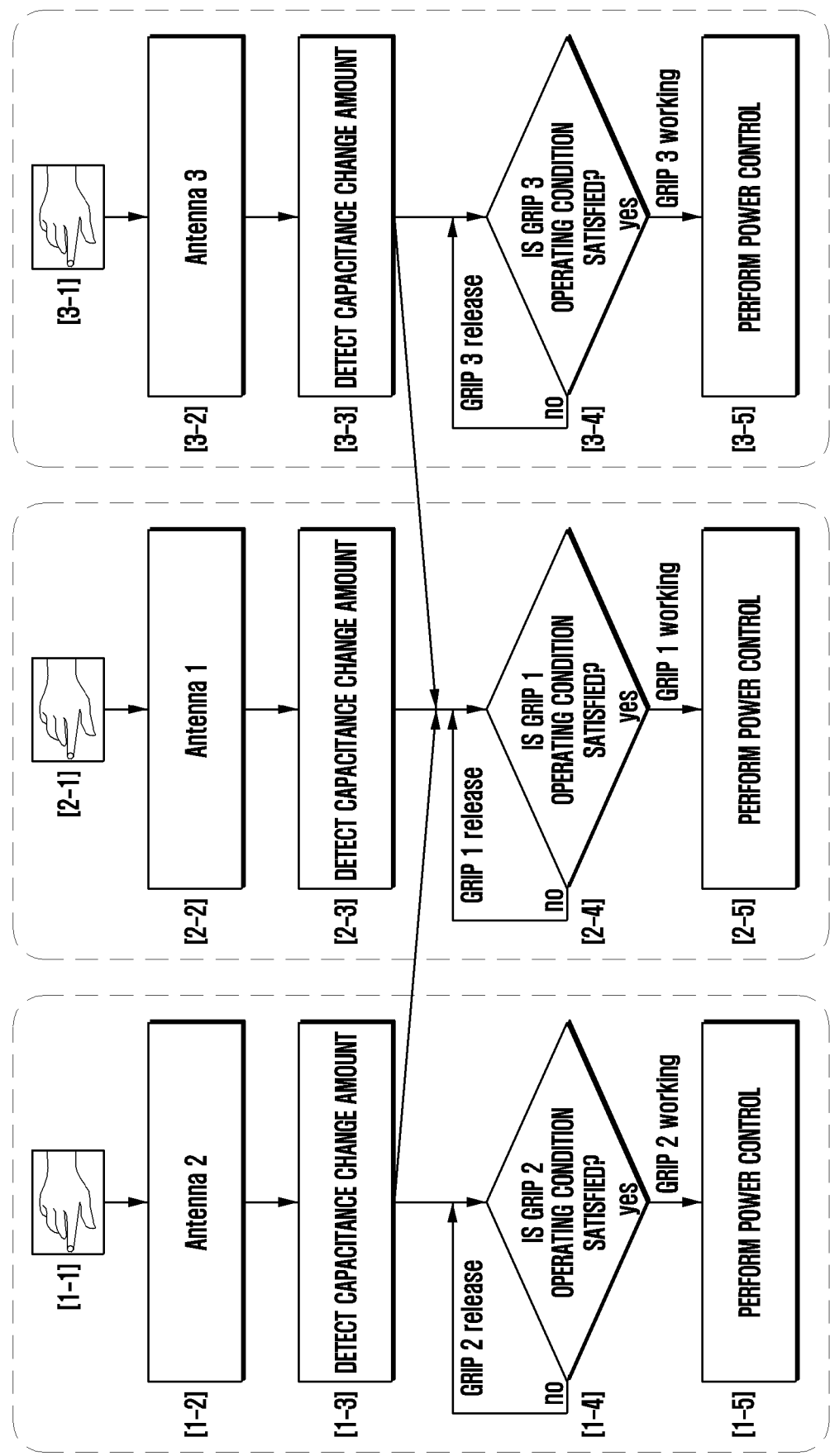
FIGS. 15 and 16 are flowcharts illustrating a method for controlling a transmission power of a communication module according to various embodiments of the disclosure.
Figure 16:
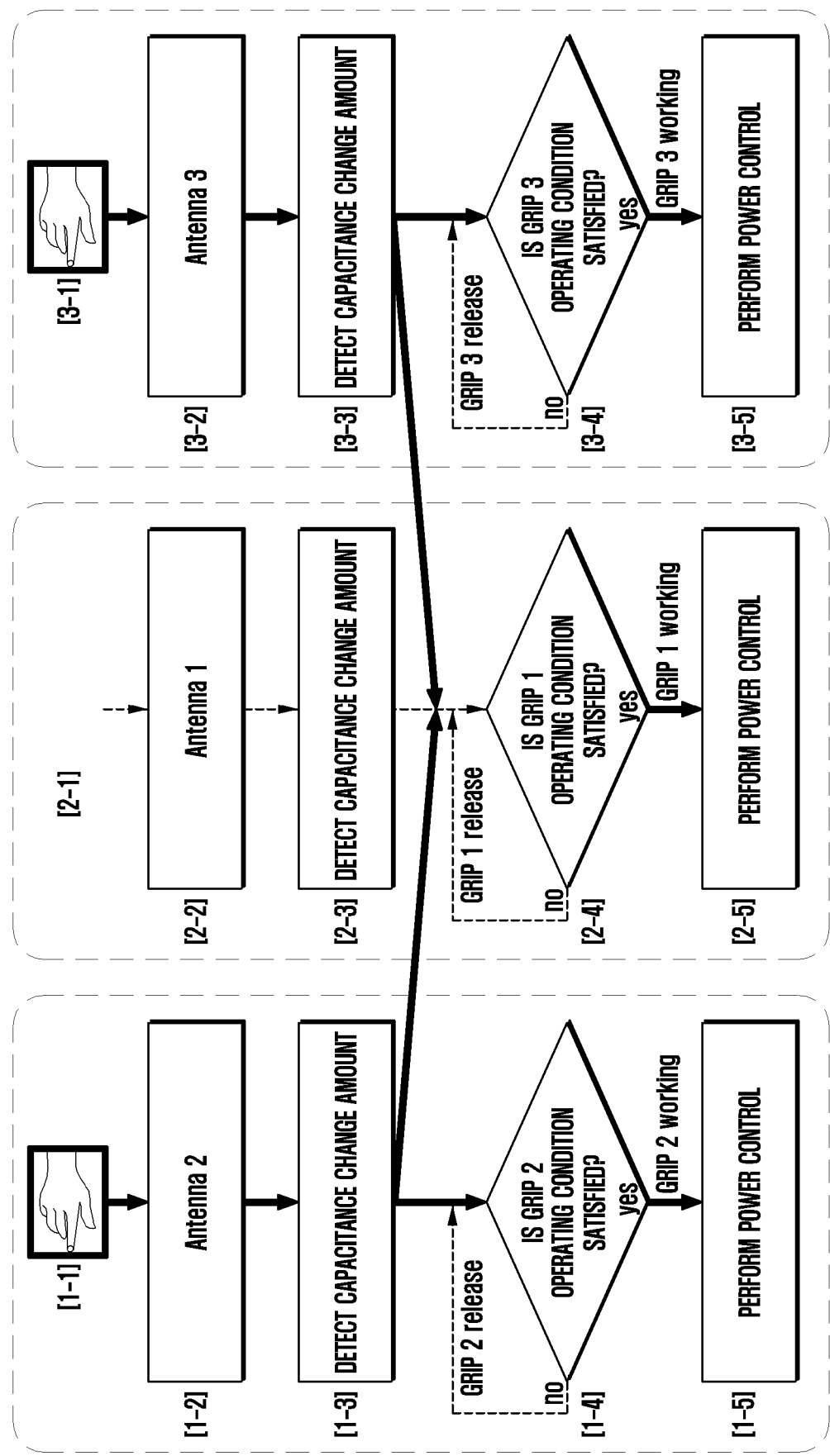

According to various embodiments, the AP 430 may receive the proximity information of the dielectric body transferred from the second antenna 412 and the third antenna 413. The AP 430 may control the transmission power of the first antenna 411 even if the proximity information of the dielectric body is unable to be received from the first antenna 411 based on the proximity information of the dielectric body from the second antenna 412 and the third antenna 413. With reference to FIGS. 15 to 17, such a transmission power control process will be described in detail.

Figure 5:
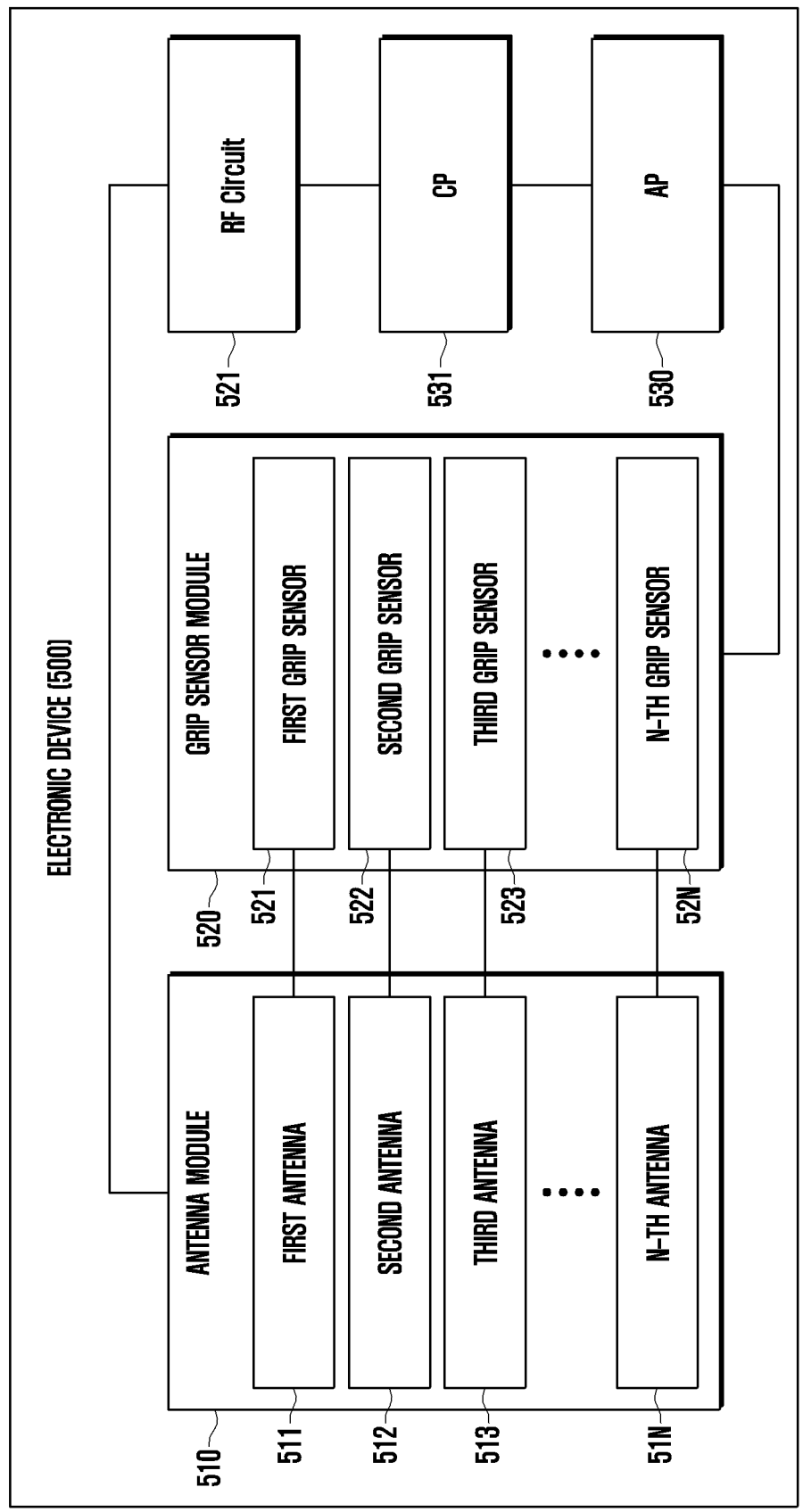
FIG. 5 is a block diagram of an electronic device according to an embodiment of the disclosure.

FIG. 5 is a block diagram of an electronic device according to an embodiment of the disclosure.

According to various embodiments, an electronic device 500 may include an antenna module 510, a grip sensor module 520, an RF circuit 301, 401, 501, an AP 530, and a CP 531.

According to various embodiments, when the power of the electronic device 500 is turned on, a first grip sensor 521, a second grip sensor 522, and a third grip sensor 523 may detect an amount of capacitance change in real time, and if the amount of capacitance change exceeds a predetermined reference value, the grip sensor may transfer the proximity information of an external dielectric body (e.g., human body) to a processor 620. That is, the grip sensor module 520 may transfer the proximity information of the dielectric body to the AP 530, and in this process, the plurality of grip sensors 52N may be utilized. The AP 530 may determine the proximity of the external dielectric body by using the plurality of grip sensors 52N including the first grip sensor 521, the second grip sensor 522, and the third grip sensor 523, and the plurality of grip sensors 52N may individually have the reference value.

According to various embodiments, the AP 530 may control the power of the antenna module 510 comprising a plurality of antennas 511, 512, 513, 51N through the CP 531 based on the proximity information of the dielectric body. The RF circuit 301, 401, 501 may service to process the RF signal received from the antenna module 510, and may be constituted in various forms including a PAM, a transceiver, a front end module including duplexers (FEMID), and a power amplifier module including duplexers (PAMID). In addition, the roles of the antenna module 510 and the grip sensor module 520 have been described in detail with reference to FIGS. 3 and 4.

Figure 6:
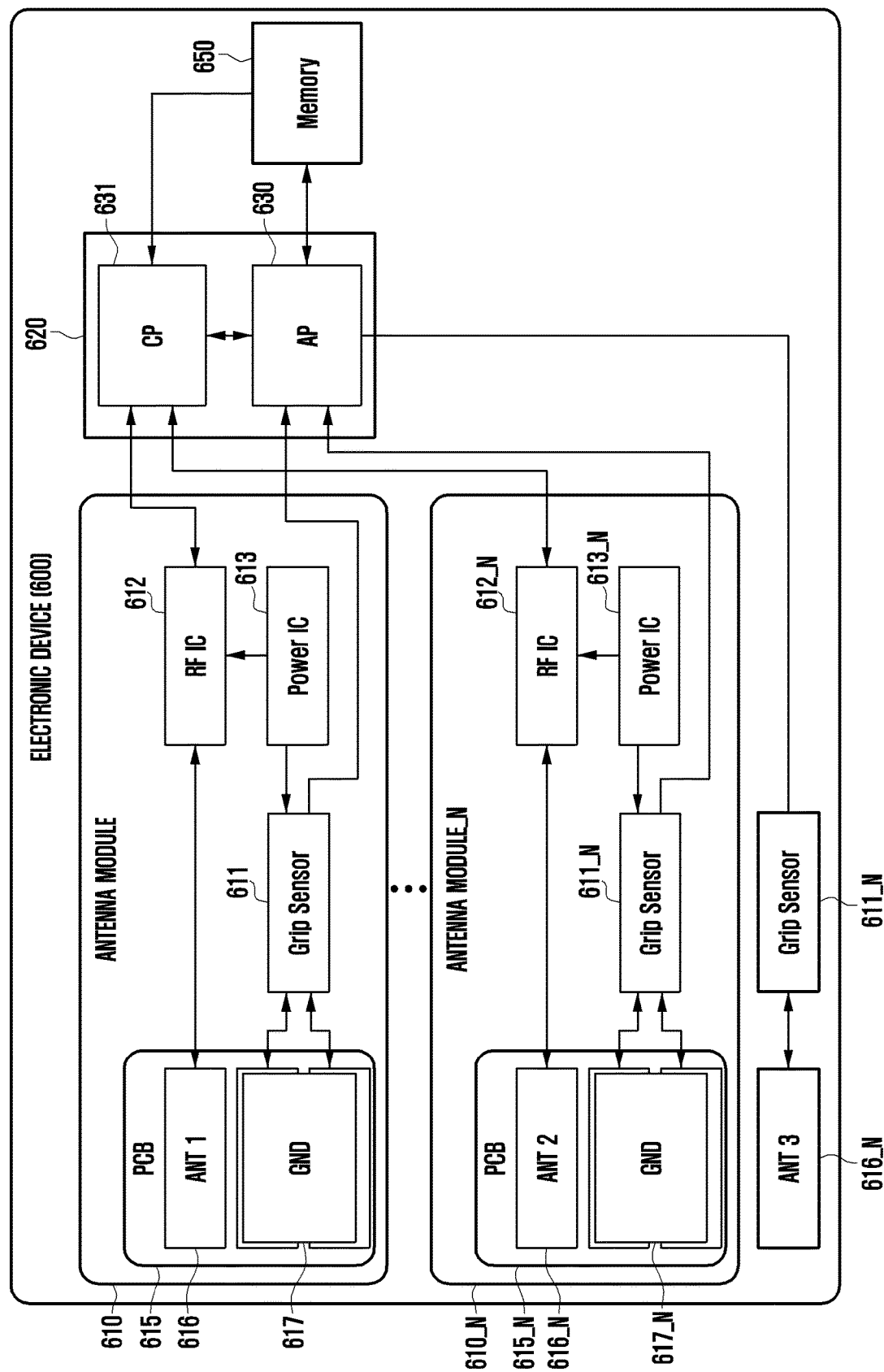
FIG. 6 is a block diagram of an electronic device in which a grip sensor is included in an antenna module in case of detecting gripping by using the grip sensor of the antenna module according to an embodiment of the disclosure.

FIG. 6 is a block diagram of an electronic device in which a grip sensor is included in an antenna module in case of detecting gripping by using the grip sensor of the antenna module according to an embodiment of the disclosure.

According to various embodiments, an electronic device 600 may include: a first antenna 511 configured to transmit and receive an RF signal of a first frequency band; a second antenna 512 disposed spaced apart from the first antenna 511 in a first direction (401), and configured to transmit and receive an RF signal of a second frequency band that is lower than the first frequency band; and a third antenna 513 disposed spaced apart from the first antenna 511 in a second direction (402) that is opposite to the first direction (401), and configured to transmit and receive an RF signal of a third frequency band that is lower than the second frequency band, a first grip sensor 521 configured to detect proximity of an external dielectric body based on a capacitance change of the first antenna 511; a second grip sensor 522 configured to detect proximity of an external dielectric body based on a capacitance change of the second antenna 512; a third grip sensor 523 configured to detect proximity of an external dielectric body based on a capacitance change of the third antenna 513; and a processor 620. In case of detecting the proximity of the external dielectric body, the first grip sensor 521, the second grip sensor 522, and the third grip sensor 523 may transmit the proximity information to the processor 620. The processor 620 may determine that the external dielectric body becomes in proximity to the first grip sensor 521 in case that the proximity information is received from the second grip sensor 522 and the third grip sensor 523.

According to various embodiments, the first frequency band of the first antenna 511 may belong to 2.5 GHz to 2.7 GHz, the second frequency band of the second antenna 512 may belong to 600 MHz to 2.4 GHz, and the third frequency band of the third antenna 513 may belong to 1.5 GHz to 2.4 GHz.

According to various embodiments, the electronic device may further include a memory 650. The memory 650 may include instructions for a transmission power control operation of the processor 620. The instructions may include an algorithm in which the processor 620 controls a transmission power of the first antenna 511 in case that the first grip sensor 521 detects an approach signal of the external dielectric body. Further, even in case that the first grip sensor 521 is unable to detect the proximity information of the external dielectric body, the processor 620 may include the algorithm in which the processor 620 controls the transmission power of the first antenna 511 when the approach signal of the external dielectric body is transferred from the second grip sensor 522 and the third grip sensor 523 to the processor 620.

Referring to FIG. 6, the electronic device 600 may include at least one antenna module (e.g., antenna module 610 to antenna module_N 610_N), the processor 620, and the memory 650.

According to another embodiment, the at least one antenna module 610 may transmit a signal of an ultrahigh frequency band (e.g., about 6 GHz to about 60 GHz) based on a 5G network (e.g., second cellular network 294 of FIG. 2).

According to various embodiments, the at least one antenna module 610 may include a printed circuit board 615, a grip sensor 611, an RF IC 612, and/or a power IC 613. According to yet another embodiment, the printed circuit board 615 may include a general antenna 616 and/or a ground (GND) 617. For example, the antenna 616 may be formed of at least one antenna element supporting the ultrahigh frequency band.

According to various embodiments, the antenna 616 included in the printed circuit board 615 may be electrically connected to the RF IC 612. The RF IC 612 may receive the power supplied from the power IC 613 included in the at least one antenna module 610. According to a further embodiment, the processor 620 may control the RF IC 612, and may transmit/receive a signal corresponding to the ultrahigh frequency band through the antenna 616.

According to various embodiments, the ground 617 may be electrically connected to the grip sensor 611. The grip sensor 611 may be electrically connected to the power IC 613 and the processor 620. According to still another embodiment, the processor 620 may control the grip sensor 611, and analyze data acquired through the grip sensor 611. According to an embodiment, if the dielectric body (e.g., dielectric substance) becomes in proximity to or comes in contact with the electronic device 600, current of hundreds of mA corresponding to the second frequency band (e.g., hundreds of KHz) that is lower than the predetermined first frequency band (e.g., hundreds of MHz or tens of GHz) may be generated through the grip sensor 611. The grip sensor 611 may measure the generated current of hundreds of mA. According to another embodiment, the grip sensor 611 may detect that the dielectric body becomes in proximity to or comes in contact with the electronic device 600.

According to various embodiments, the processor 620 may include an application processor (AP) 630 (e.g., main processor 121 of FIG. 1) and a communication processor (CP) 631 (e.g., auxiliary processor 123 of FIG. 1). According to yet another embodiment, the application processor 630 may process a command or data received from other constituent elements (e.g., at least one antenna module 610), or may store the command or data in the memory 650.

According to various embodiments, the memory 650 may store data related to the proximity or contact of the dielectric body. According to a further embodiment, the memory 650 may store data corresponding to the grip shape for the electronic device 600. For example, the processor 620 may identify whether the electronic device 600 is gripped and the grip shape based on the data acquired through the grip sensor 611. The data may be stored in the form of a table. According to still another embodiment, the processor 620 may detect the proximity of the dielectric body based on first data acquired through the grip sensor 611 and second data stored in the memory 650.

According to various embodiments, the memory 650 may store data for adjusting the power of a transmission signal in response to the proximity of the dielectric body. The data may be stored in the form of a table. According to an embodiment, the power of the transmission signal may be set to be less than a predetermine threshold value so as not to exert a bad influence on the human body. For example, the power of the transmission signal may have a value within a range where the power does not exert a bad influence on the human body while performing communication based on the ultrahigh frequency band. According to another embodiment, the data may include a specific absorption rate (SAR) allowable reference value. According to yet another embodiment, the processor 620 may lower the power of the transmission signal based on the SAR allowable reference value so that the power does not exert a bad influence on the human body.

According to various embodiments, at least one grip sensor 611 to 611_N may be included in at least one antenna module 610 to 610N.

Figure 7A:
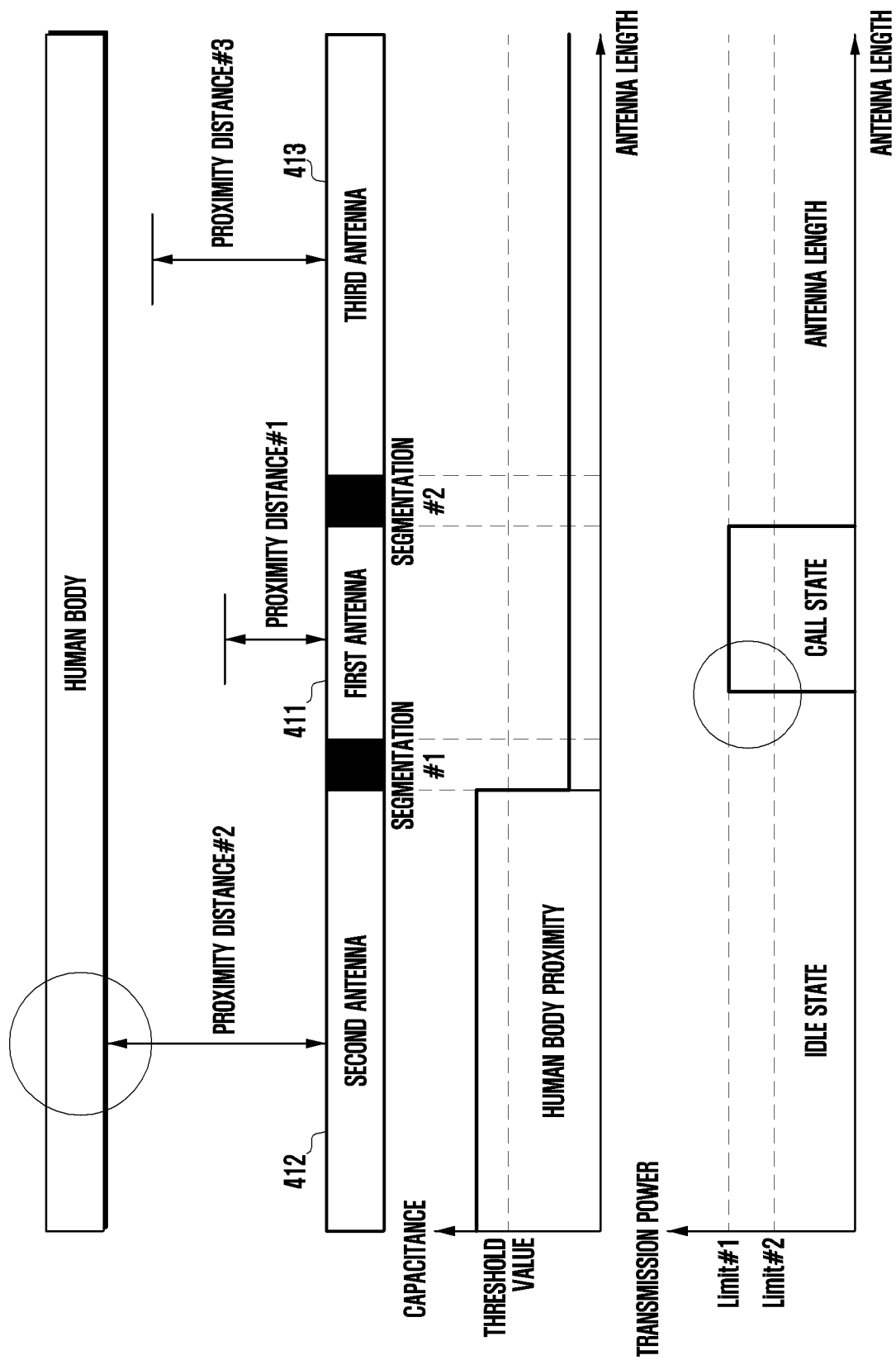
FIGS. 7A, 7B, and 7C illustrate a transmission power changing process of an antenna when a human body is in proximity to an electronic device according to various embodiments of the disclosure.
Figure 7B:
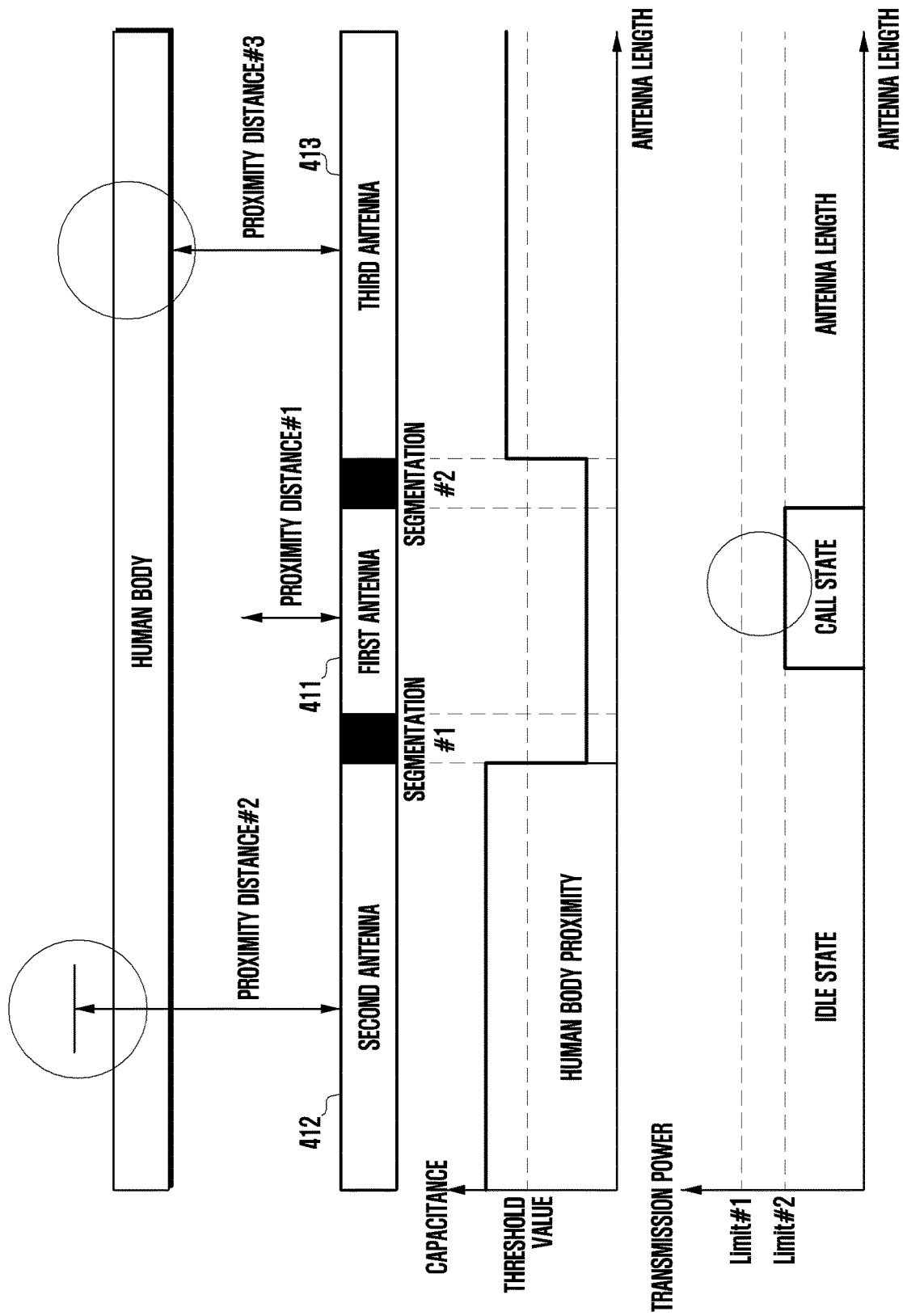
Figure 7C:
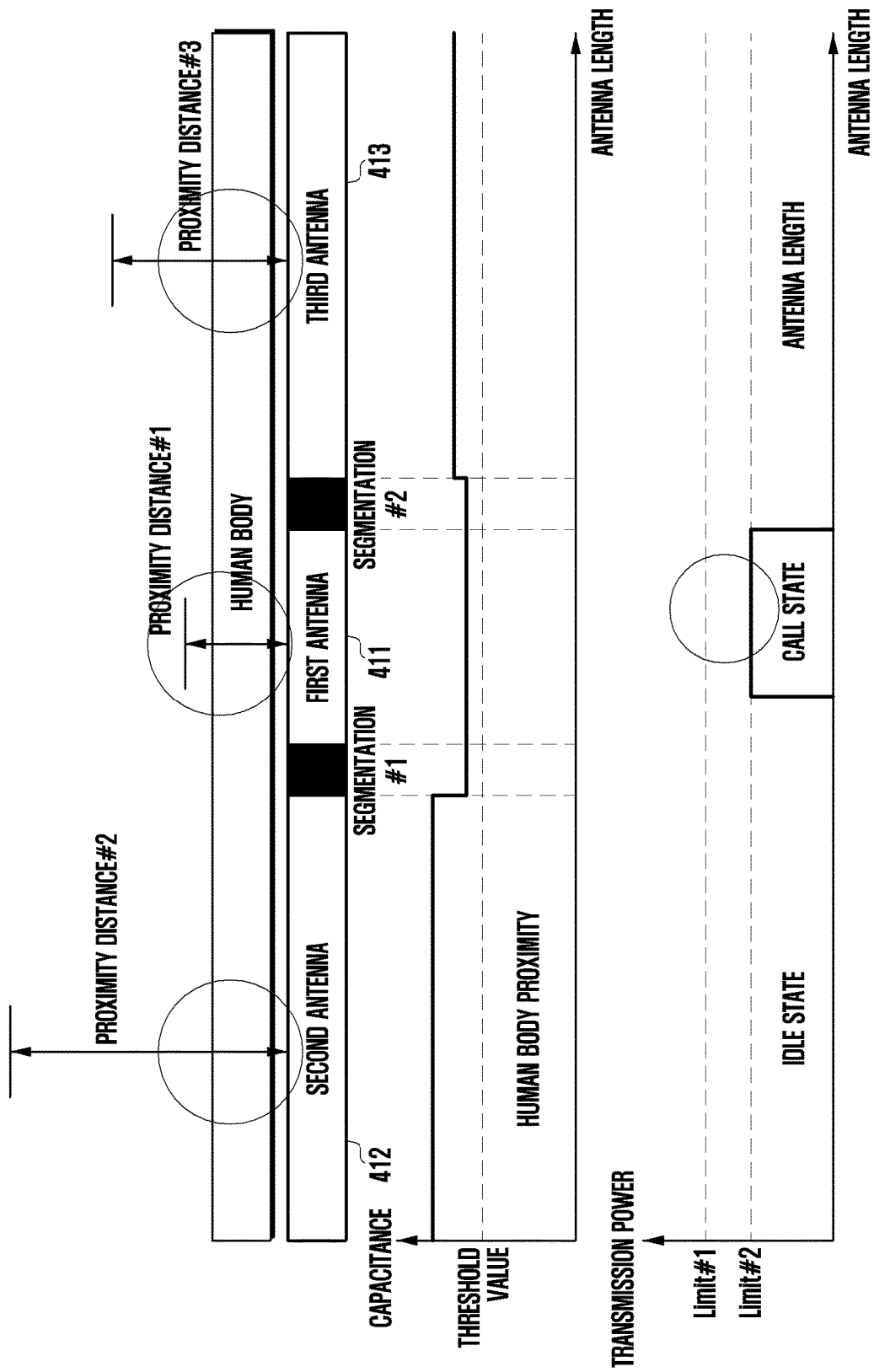

FIGS. 7A to 7C illustrate a transmission power changing process of an antenna when a human body is in proximity to an electronic device according to various embodiments of the disclosure.

Referring to FIG. 7A, a human body may approach within a proximity distance of the second antenna 412. In this case, the second grip sensor 422 connected to the second antenna 412 may detect the capacitance change of the dielectric body, and if the amount of capacitance change exceeds the predetermined threshold value, it may transfer the related human body proximity information to the AP 430. The AP 430 may receive the human body proximity information transferred from the second grip sensor 422, and it may be considered together that information being determined as the human body proximity has not been transferred from the first grip sensor 421 and the third grip sensor 423. In this case, the AP 430 may not determine that the human body becomes in proximity to the first antenna 411, and may maintain the level of Limit #1 without reducing the power of the first antenna 411 that is under transmission.

Referring to FIG. 7B, the human body may approach within the proximity distance of the second antenna 412 and the third antenna 413. In this case, the second grip sensor 422 connected to the second antenna 412 and the third grip sensor 423 connected to the third antenna 413 may detect the capacitance change of the human body, and if the amount of capacitance change exceeds the predetermined threshold value, they may transfer the related human body proximity information to the AP 430. The AP 430 may receive the human body proximity information transferred from the second grip sensor 422 and the third grip sensor 423, and it may be considered together that information being determined as the human body proximity has not been transferred from the first grip sensor 421. In this case, the AP 430 may reduce the power of the first antenna 411 that is under transmission from the level of Limit #1 to the level of Limit #2. The power reduction level of the first antenna 411 may not be fixed to Limit #2, but the power may be reduced to another value like Limit #3 in accordance with the SAR standards.

Referring to FIG. 7C, the human body may approach within the proximity distance of the second antenna 412, the third antenna 413, and the first antenna 411, and maintain the contact state. In this case, the first grip sensor 421 connected to the first antenna 411 may detect the capacitance change of the dielectric body, and if the amount of capacitance change exceeds the predetermined threshold value, it may transfer the related human body proximity information to the AP 430. The AP 430 may receive the information being determined as the human body proximity from the first grip sensor 421, and in this case, the AP 430 may reduce the power of the first antenna 411 that is under transmission from the level of Limit #1 to the level of Limit #2. The power reduction level of the first antenna 411 may not be fixed to Limit #2, but the power may be reduced to another value like Limit #3 in accordance with the SAR standards.

Comparing FIGS. 7B and 7C with each other, in FIG. 7C, the first antenna 411 can recognize the human body only in case that the human body approaches the proximity distance #1 of the first antenna 411. In contrast, in FIG. 7B, it is possible to control the transmission power of the first antenna 411 even if the human body does not approach the proximity distance #1 of the first antenna 411 by utilizing the second antenna 412 and the third antenna 413.

Figure 8:
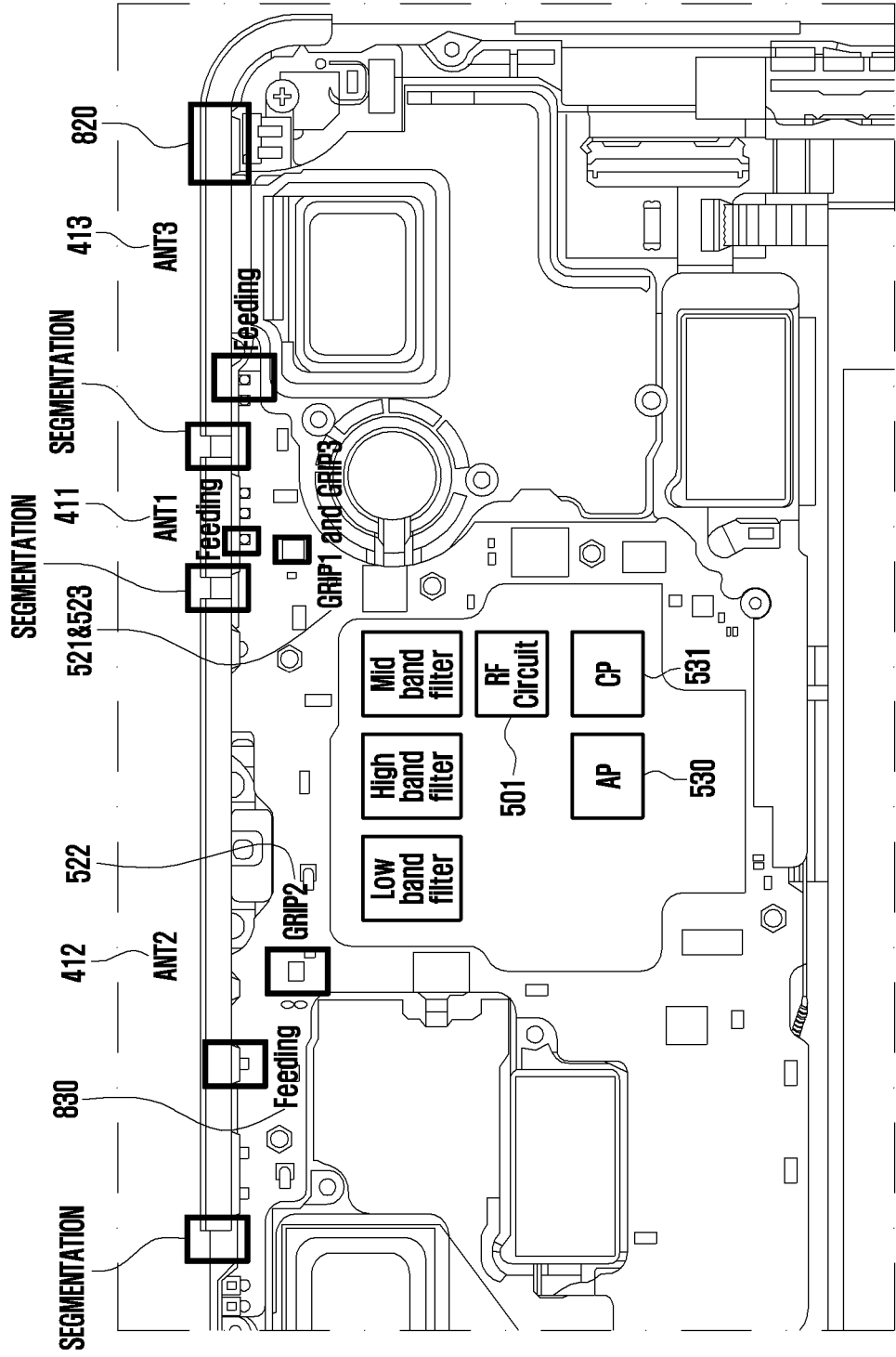
FIG. 8 is a plan view of an electronic device according to an embodiment of the disclosure.

FIG. 8 is a plan view of an electronic device according to an embodiment of the disclosure.

Figure 9:
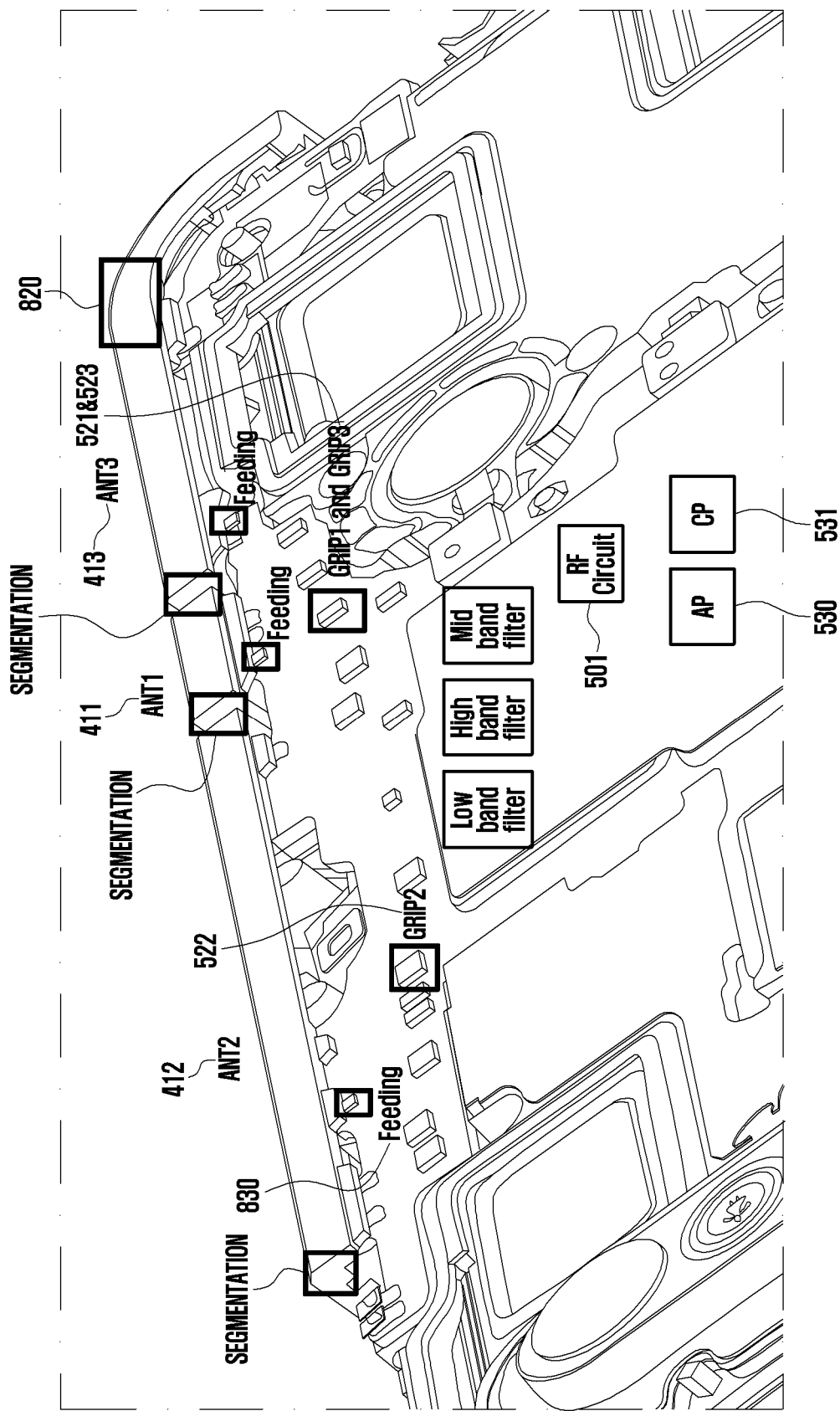
FIG. 9 is a perspective view of an electronic device according to an embodiment of the disclosure.

FIG. 9 is a perspective view of an electronic device according to an embodiment of the disclosure.

Figure 10:
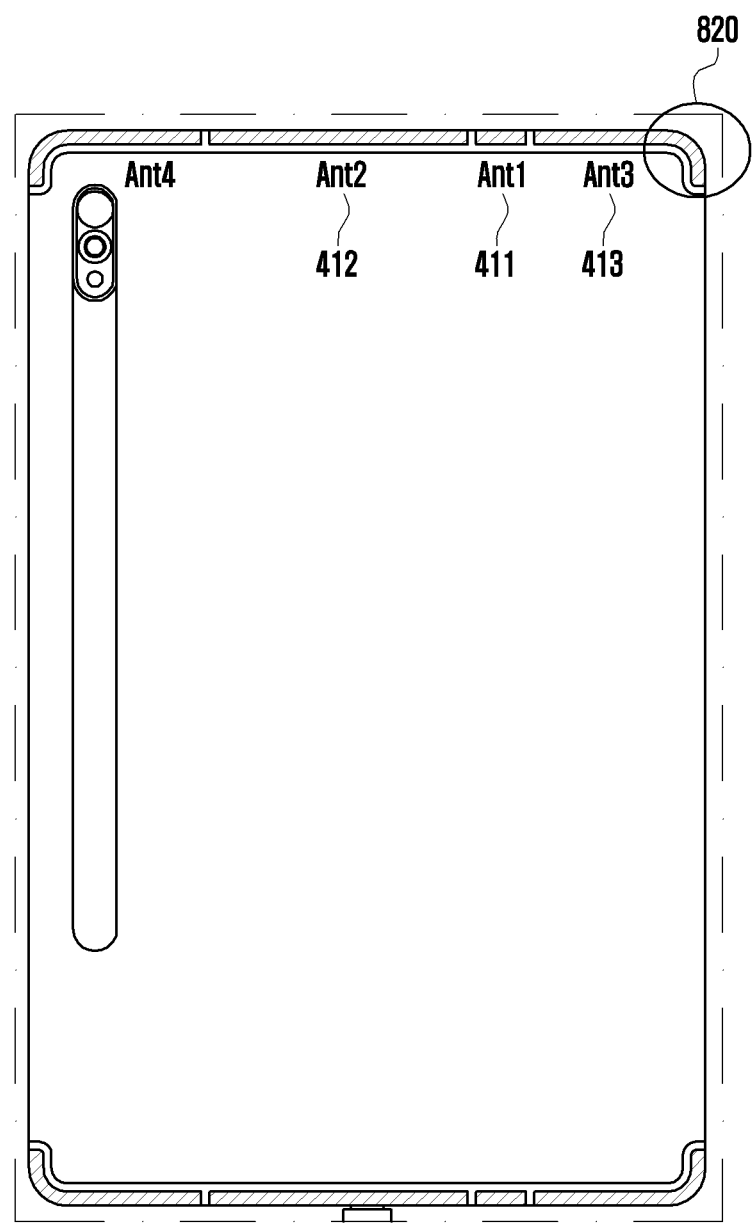
FIG. 10 is a rear view of an electronic device according to an embodiment of the disclosure.

FIG. 10 is a rear view of an electronic device according to an embodiment of the disclosure.

Figure 11:
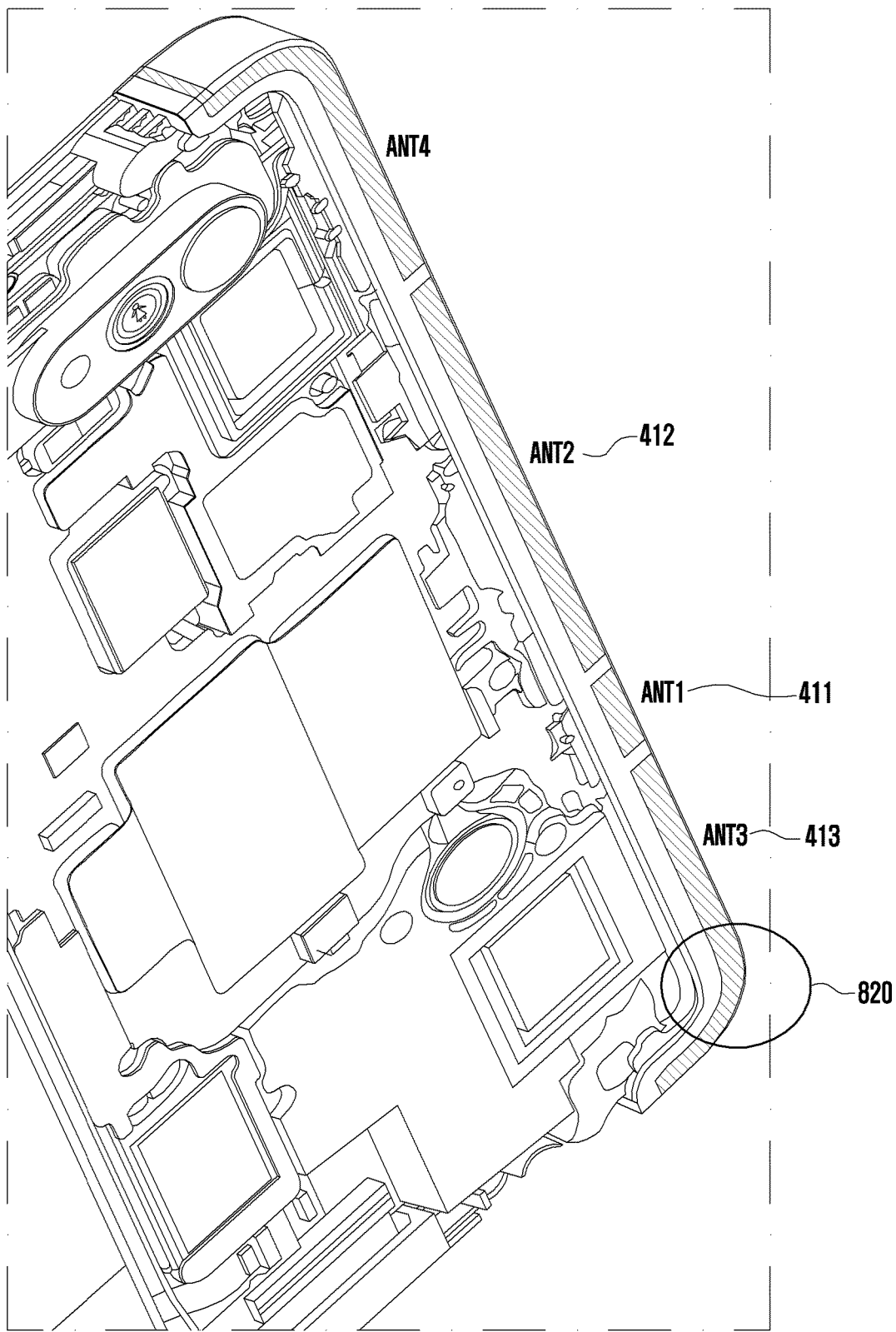
FIG. 11 is a perspective view of an electronic device according to an embodiment of the disclosure.

FIG. 11 is a perspective view of an electronic device according to an embodiment of the disclosure.

Referring to FIG. 8, the electronic device 101 may include the first antenna 411, the second antenna 412, the third antenna 413, the first grip sensor 521, the second grip sensor 522, the third grip sensor 523, the AP 530, the CP 531, the RF circuit 301, 401, 501, a housing 820, a feeding 830, and a filter.

According to various embodiments, the first antenna 411 may transmit and receive the RF signal of the first frequency band. The second antenna 412 may be disposed spaced apart from the first antenna 411 in the first direction (401), and may transmit and receive the RF signal of the second frequency band that is lower than the first frequency band. The third antenna 413 may be disposed spaced apart from the first antenna 411 in the second direction (402) that is opposite to the first direction (401), and may transmit and receive the RF signal of the third frequency band that is lower than the second frequency band.

According to various embodiments, the first grip sensor 421 may detect the proximity of the external dielectric body based on the capacitance change of the first antenna 411. The second grip sensor 422 may detect the proximity of the external dielectric body based on the capacitance change of the second antenna 412. The third grip sensor 423 may detect the proximity of the external dielectric body based on the capacitance change of the third antenna 413.

Referring to FIGS. 8 and 11, the first antenna 411, the second antenna 412, and the third antenna 413 may be located in the housing 820 of the electronic device 101. The first grip sensor 521, the second grip sensor 522, the third grip sensor 523, the AP 530, the CP 531, and the RF circuit 501 may be located inside the electronic device 101. The first antenna 411, the second antenna 412, and the third antenna 413 may transmit and receive signals for communication, and may generate electromagnetic waves. That is, the antenna may emit the electromagnetic waves to transmit and receive the RF signal, and thus the electromagnetic waves may be absorbed from the antenna located around the housing 820 to the user's body. In order to prevent this, the electronic device 101 should satisfy the SAR regulations, and in relation to this, the detailed description has been made with reference to FIG. 3. FIGS. 10 and 11 show the locations of the antennas, and it can be understood that the electromagnetic waves emitted from the antennas may exert an influence on the user's body.

Referring to FIGS. 8 to 11, it can be known that the AP 530 and the RF circuit 501 are located relatively inside the electronic device as compared with the antenna. The first antenna 411, the second antenna 412, and the third antenna 413 may be located on the housing 820 of the electronic device 101.

Referring to FIGS. 10 and 11, the housing 820 of the electronic device may be located on the surface of the electronic device 101. In case that the user uses the electronic device 101, the housing 820 may come in contact with the human body. In this case, the antenna located near the housing 820 may also exert an influence on the human body.

In particular, the high frequency (e.g., frequency range (2.5 GHz to 2.7 GHz) of the first antenna 411) may exert a harmful influence on the human body. Accordingly, the transmission power of the antenna should be reduced during the human body proximity. However, the length of the antenna that is in charge of high frequency and the recognition distance of the grip sensor tend to be shortened. For example, in case of the first antenna 411 in charge of the high frequency of 2.5 GHz to 2.7 GHz, the length of the antenna may be merely about 5 mm, and the recognition distance of the grip sensor may be merely about 7 mm. Due to such a short recognition distance of the grip sensor, it may be difficult to satisfy the SAR regulations. In order to prevent this, the process of utilizing the second antenna 412 and the third antenna 413 near the first antenna 411 has been described in detail with reference to FIGS. 7A to 7C.

FIG. 12 illustrates the characteristics of an antenna and a grip sensor according to an embodiment of the disclosure.

As described above with reference to FIG. 4, the electronic device may be provided with various antennas to support various frequencies. According to various embodiments, the electronic device may include the first antenna for high frequencies, and the second antenna and the third antenna for low frequencies located on both sides of the first antenna. The first antenna may support the high frequency in the band of 2.5 GHz to 2.7 GHz, and the physical length of the antenna and the recognition distance of the grip sensor may be relatively shorter than those of the second antenna and the third antenna. The second antenna may support the low frequencies in the band of 600 MHz to 2.4 GHz, and the physical length of the antenna and the recognition distance of the grip sensor may be relatively longer than those of the first antenna. The third antenna may support the low frequencies in the band of 1.5 GHz to 2.4 GHz, and the physical length of the antenna and the recognition distance of the grip sensor may be relatively much longer than those of the first antenna. The first antenna may be used for the purpose of supporting 5G, the second antenna may be used for the purpose of supporting LTE, and the third antenna may be used for the purpose of supporting WiFi and GPS.

According to various embodiments, it can be identified through the numerical values of FIG. 12 that as the frequency being supported becomes higher, the physical length of the antenna may become shorter, and the recognition distance of the grip sensor may also become shorter.

According to various embodiments, the electronic device may further include a memory, and the memory may include instructions for a transmission power control operation of a processor. The instructions may include an algorithm in which the processor controls the transmission power of the first antenna in case that the first grip sensor detects an approach signal of the external dielectric body, and the instructions may further include an algorithm in which the processor controls the transmission power of the first antenna when the approach signal of the external dielectric body is transferred from the second grip sensor and the third grip sensor to the processor, even in case that the first grip sensor is unable to detect the proximity information of the external dielectric body.

According to various embodiments, even in case that the proximity information is not received from the first grip sensor, the processor may determine that the external dielectric body is in proximity to the first grip sensor when the proximity information is received from the second grip sensor and the third grip sensor.

According to various embodiments, if it is determined that the external dielectric body is in proximity to the first grip sensor, the processor may be configured to reduce a transmission power of the first antenna based on the determination.

According to various embodiments, the electronic device may further include a communication processor, and if it is determined that the external dielectric body is in proximity to the first grip sensor, the processor may be configured to transmit a control signal for instructing the communication processor to reduce the transmission power of the first antenna, and the communication processor may be configured to reduce the transmission power of the first antenna.

According to various embodiments, the first antenna, the second antenna, and the third antenna may have at least one form of a planar inverted F antenna (PIFA), a semi-PIFA, and a mono pole antenna.

According to various embodiments, the second antenna and the third antenna may have a longer length than the length of the first antenna. Further, the second grip sensor and the third grip sensor may have a longer proximity recognition distance than the proximity recognition distance of the first grip sensor.

According to various embodiments, the first grip sensor, the second grip sensor, and the third grip sensor may detect an amount of capacitance change in real time when a power of the electronic device is turned on, and transfer the proximity information of the external dielectric body to the processor in case that the amount of capacitance change exceeds a predetermined reference value.

According to various embodiments, the processor may use a plurality of grip sensors including the first grip sensor, the second grip sensor, and the third grip sensor in determining the proximity of the external dielectric body, and the plurality of grip sensors may individually have the reference value.

Figure 13:
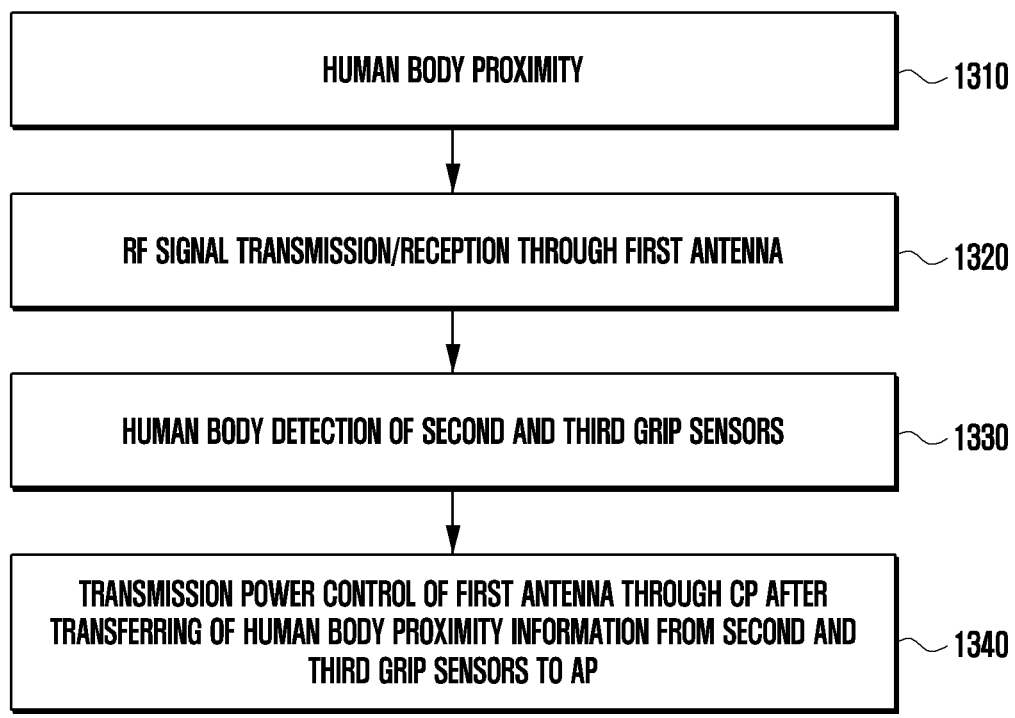
FIG. 13 illustrates an algorithm of a method for controlling a transmission power according to an embodiment of the disclosure.

FIG. 13 illustrates an algorithm of a method for controlling a transmission power according to an embodiment of the disclosure.

According to various embodiments, a method for controlling a transmission power of an electronic device 500 may include: determining proximity of an external dielectric body by using a first grip sensor 521, a second grip sensor 522, and a third grip sensor 523; and controlling a transmission power of the electronic device 500 based on the proximity of the external dielectric body. Determining the proximity of the external dielectric body may include determining that the external dielectric body is in proximity to the first grip sensor 521 in case of receiving proximity information from the second grip sensor 522 and the third grip sensor 523.

In operation 1310, the dielectric body may become in proximity to the electronic device 500. In case of the proximity of the dielectric body, the capacitance may be changed, and the dielectric body proximity sensing module (e.g., grip sensor) may detect the capacitance change amount. In this case, a medium that causes the occurrence of the capacitance change may include not only all parts of the dielectric body but also a dielectric body that causes the occurrence of an electrical induction.

In operation 1320, the electronic device may be in a state where it transmits and receives the RF signal through the first antenna 511. As described above, the first antenna 511 may be for high frequencies and may correspond to a support frequency of 2.5 GHz to 2.7 GHz, and thus the physical length of the antenna may be short. The first grip sensor 521 connected to the first antenna 511 may also be influenced by the physical length of the antenna, and as described above, as the antenna length is shorter, the operation distance of the grip sensor may also be relatively shorter. The operation range of the first grip sensor 521 may be relatively shorter than those of other grip sensors, and may not satisfy the SAR regulations.

In operation 1330, the physical lengths of the second antennas 512 and third antennas 513 in charge of the low frequency band may be relatively longer than the physical length of the first antenna 511. The operation distances of the second grip sensor 522 and third grip sensor 523 connected thereto may also be longer than that of the first grip sensor 521. Accordingly, during the proximity of the dielectric body, the first grip sensor 521 may not detect the proximity of the dielectric body, but the second grip sensor 522 and third grip sensor 523 may detect the proximity of the dielectric body.

In operation 1340, the second grip sensor 522 and third grip sensor 523 may transfer the detected dielectric body proximity information to the AP 530. If a proximity notification is sent from the second grip sensor 522 and the third grip sensor 523 even in case that the proximity notification is unable to be received from the first grip sensor 521, the AP 530 may control the power of the first antenna based on this. In this process, the AP 530 may execute a power control through the CP 531, and may satisfy the SAR regulations by lowering the transmission power of the first antenna 511. Further, since the short recognition distance of the first grip sensor 521 is complemented through the second grip sensor 522 and the third grip sensor 523, it is possible to bring the effects of satisfying the SAR regulations even without increasing the size of the antenna.

Figure 14:
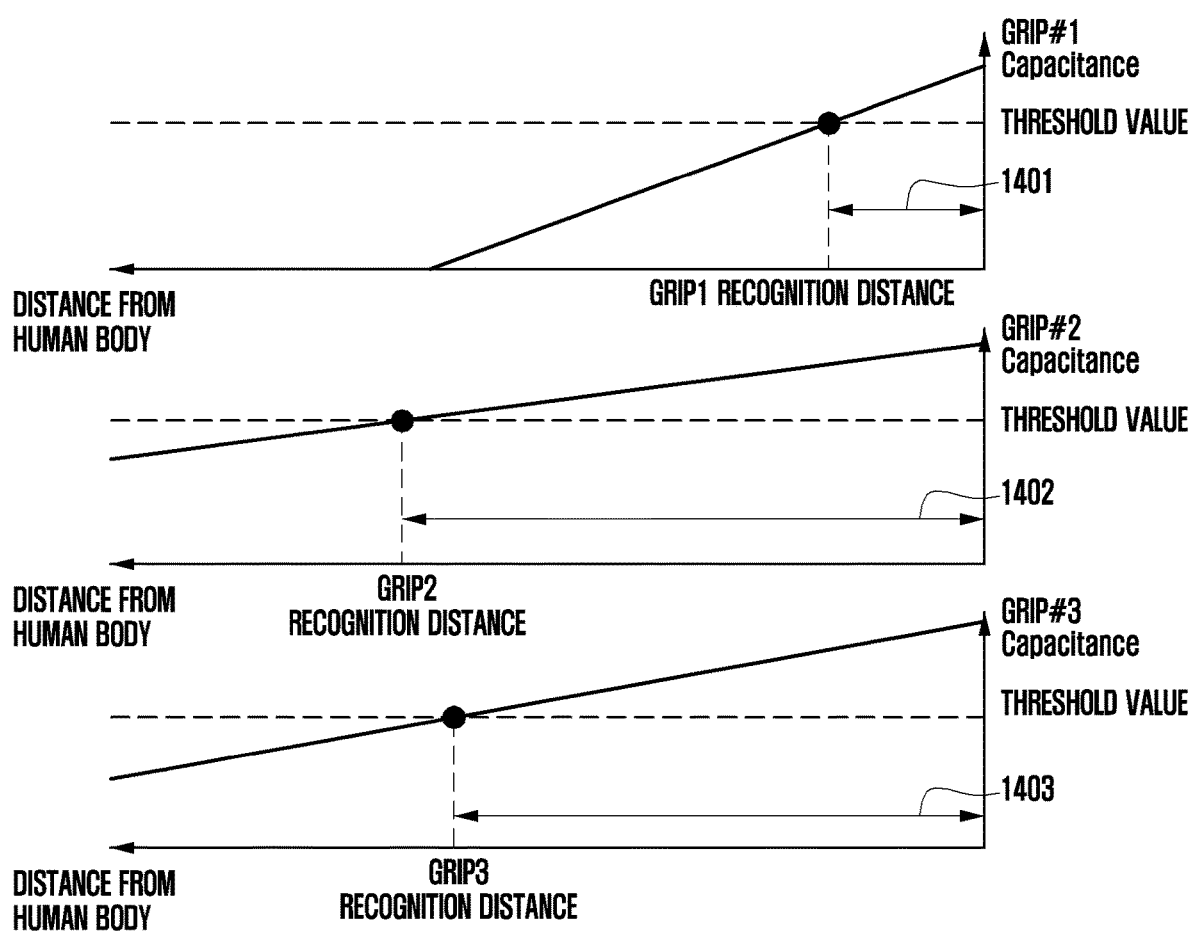
FIG. 14 is a graph illustrating a capacitance change amount and a recognition distance for each grip sensor in accordance with a distance from a human body according to an embodiment of the disclosure.

FIG. 14 is a graph illustrating a capacitance change amount and a recognition distance for each grip sensor in accordance with a distance from a human body according to an embodiment of the disclosure.

Referring to FIG. 14, the x axis represents the distance from the human body, and the y axis represents the amount of capacitance change. During the proximity of the dielectric body including the human body, the capacitance may be changed, and as described above, the grip sensor module 520 may detect the amount of capacitance change, and if the detected amount of capacitance change exceeds the predetermine threshold value, the AP 530 may determine this as the proximity of the human body.

According to various embodiments, the electronic device 500 may include a plurality of antennas 511, 512, 513, 51N of an antenna module 510 and a plurality of grip sensors 521, 522, 523, 52N if a grip sensor module 520, and may have a separate recognition distance for each grip sensor. The first grip sensor 521 may be connected to the first antenna 511 in charge of the high frequencies, and it can be identified that the recognition distance 1401 of the first grip sensor is relatively shorter than the recognition distance 1402 of the second grip sensor and the recognition distance 1403 of the third grip sensor. Accordingly, even in case of the proximity of the human body, the first grip sensor 521 may not detect the proximity of the human body, and the process of complementing the short recognition distance of the first grip sensor 521 by utilizing the second grip sensor 522 and the third grip sensor 523 having the long recognition distance has been described.

FIGS. 15 and 16 are flowcharts illustrating a method for controlling a transmission power of a communication module according to various embodiments of the disclosure.

Referring to 1-1, 2-1, and 3-1 of FIG. 15, the dielectric body may be in proximity to the antenna module 510. If the dielectric body including the dielectric substance becomes in proximity to the antenna, a dielectric body proximity sensing module (e.g., grip sensor) may cause the capacitance change.

Referring to 1-3, 2-3, and 3-3, the grip sensor module 520 may detect the capacitance change since the power of the electronic device 500 is turned on, and may transmit the capacitance change information to the AP 530. The AP 530 may always monitor the capacitance change.

With reference to 1-4, 2-4, and 3-4, the AP 530 may determine the proximity of the dielectric body with reference to the amount of capacitance change being transferred from the grip sensor module 520. The conditions to determine the proximity of the dielectric body may be differently determined for each electronic device 500 or grip sensor module 520 (e.g., predetermined threshold value of the amount of capacitance change, or operation recognition distance of the grip sensor in accordance with the antenna length). In this process, as described above, the recognition distance of the first grip sensor 521 connected to the first antenna 511 in charge of the high frequencies may be relatively short. In order to complement this, the process of determining the proximity of the dielectric body by utilizing the amounts of capacitance change in not only 2-3 but also 1-3 and 3-3 has been described.

Referring to FIG. 16, since the recognition distance of the first grip sensor 521 connected to the first antenna 511 is short, the first grip sensor 521 may not detect the proximity of the dielectric body. In this case, the second grip sensor 522 and the third grip sensor 523 having relatively long recognition distances may detect the proximity of the dielectric body. In this case, the proximity information of the second grip sensor 522 and the third grip sensor 523 may be continuously transferred to the AP 530, and the AP 530 may perform the transmission power control of the first antenna 511 even in case that the proximity of the dielectric body is not detected by the first grip sensor 521 based on the transferred proximity information. Through this, as described above, the relatively short recognition distance of the first grip sensor 521 can be complemented, and the SAR regulations can be satisfied.

FIG. 17 is a table in which power control operations of an AP in accordance with detection of human body approach by antennas are arranged according to an embodiment of the disclosure.

According to cases 2, 4, 6, and 7, if the amount of capacitance change detected by the first grip sensor 521 connected to the first antenna 511 exceeds the predetermined threshold value, the AP 530 may determine the proximity of the human body, and may perform the power control operation. "Working" may mean that the AP 530 performs the transmission power control operation of the first antenna 511, and "Not Working" may mean that the AP 530 does not perform the transmission power control operation of the first antenna 511. However, the first grip sensor 521 connected to the first antenna 511 in charge of the high frequencies may have a relatively short operation distance, and thus it may be difficult to satisfy the SAR regulations.

Case 5 represents a case of utilizing the second grip sensor 522 and the third grip sensor 523 having relatively longer recognition distances in order to complement the short recognition distance of the first grip sensor 521. Even if only the second antenna 512 and the third antenna 513 transmit the information that is determined as the proximity of the human body, the AP 530 may determine that the human body becomes in proximity to the first antenna 511, and may perform the transmission power control based on this. Through this, it is possible to complement the short recognition distance of the first grip sensor 521 even without increasing the physical size of the antenna, and thus it is possible to satisfy the SAR regulations.

Cases 1 and 3 represent a case where only any one of the second antenna 512 and the third antenna 513 detects the proximity of the human body. In this case, unlike Case 5, it may be difficult to predicate that a user grips the electronic device 500, and the AP 530 may determine that in Cases 1 and 3, rather than Case 5, the probability that the human body becomes in proximity near the first antenna 511 is low. Accordingly, in Cases 1 and 3, the AP 530 may not perform the transmission power control operation of the first antenna 511, and through this process, the AP 530 may efficiently operate the electronic device by performing, if necessary, the power control operation.

FIG. 18 is a table in which effects in accordance with a method for controlling a transmission power of a communication module are arranged according to an embodiment of the disclosure.

According to various embodiments, through the method for controlling the transmission power of the communication module according to the disclosure, the operation distance of the grip sensor may be increased from 7 mm to 14 mm. Further, in the related art, the transmission power of the antenna should be limited to 22.5 dBm in order to satisfy the SAR regulations, and if the power is increased to 24 dBm, the SAR value becomes 1.6 W/kg, and thus it may be difficult to satisfy the SAR regulations. Through the transmission power control method according to the disclosure, the operation distance of the grip sensor may be increased, and through this, the SAR value may be reduced to 0.8 W/kg even if the transmission power of the antenna is increased to 24 dBm. Accordingly, the transmission power of the antenna can be increased, and thus the performance of the electronic device can be improved.

According to various embodiments, a method for controlling a transmission power of an electronic device may include: determining proximity of an external dielectric body by using a first grip sensor, a second grip sensor, and a third grip sensor; and controlling a transmission power of the electronic device based on the proximity of the external dielectric body, wherein determining the proximity of the external dielectric body includes determining that the external dielectric body is in proximity to the first grip sensor in case of receiving proximity information from the second grip sensor and the third grip sensor.

According to various embodiments, a memory may be further included, the memory may include instructions for a transmission power control operation of a processor, and the instructions may include an algorithm in which the processor controls the transmission power of the first antenna in case that the first grip sensor detects an approach signal of the external dielectric body. Further, the instructions may include an algorithm in which the processor controls the transmission power of the first antenna when the approach signal of the external dielectric body is transferred from the second grip sensor and the third grip sensor to the processor, even in case that the first grip sensor is unable to detect the proximity information of the external dielectric body.

According to various embodiments, a communication processor may be further included, and if it is determined that the external dielectric body is in proximity to the first grip sensor, the processor may be configured to transmit a control signal for instructing the communication processor to reduce the transmission power of the first antenna, and the communication processor may be configured to reduce the transmission power of the first antenna.

According to various embodiments, the first frequency band of the first antenna may belong to 2.5 GHz to 2.7 GHz. The second frequency band of the second antenna may belong to 600 MHz to 2.4 GHz. The third frequency band of the third antenna may belong to 1.5 GHz to 2.4 GHz.

According to various embodiments, the first antenna, the second antenna, and the third antenna may have at least one form of a planar inverted F antenna (PIFA), a semi-PIFA, and a mono pole antenna.

According to various embodiments, the second grip sensor and the third grip sensor may have a longer proximity recognition distance than the proximity recognition distance of the first grip sensor.

According to various embodiments, the lengths of the second antenna and the third antenna may be longer than the length of the first antenna.

According to various embodiments, the first grip sensor, the second grip sensor, and the third grip sensor may detect an amount of capacitance change in real time when a power of the electronic device is turned on, and transfer the proximity information of the external dielectric body to the processor in case that the amount of capacitance change exceeds a predetermined reference value. Further, the reference value may be individually determined in accordance with the grip sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first antenna configured to transmit and receive a first radio frequency (RF) signal of a first frequency band;
   a second antenna spaced apart from the first antenna in a first direction, and configured to transmit and receive a second RF signal of a second frequency band that is lower than the first frequency band;
   a third antenna spaced apart from the first antenna in a second direction that is opposite to the first direction, and configured to transmit and receive a third RF signal of a third frequency band that is lower than the second frequency band;
   a first grip sensor configured to detect proximity of an external dielectric body based on a capacitance change of the first antenna;
   a second grip sensor configured to detect proximity of the external dielectric body based on a capacitance change of the second antenna;
   a third grip sensor configured to detect proximity of the external dielectric body based on a capacitance change of the third antenna; and
   a processor operatively connected to the first grip sensor, the second grip sensor, and the third grip sensor,
   wherein when detecting the proximity of the external dielectric body, the first grip sensor, the second grip sensor, and the third grip sensor transmit proximity information to the processor, and
   wherein the processor is configured to determine that the external dielectric body is in proximity to the first grip sensor when receiving the proximity information from the second grip sensor and the third grip sensor.

2. The electronic device of claim 1, further comprising:
   a memory,
   wherein the memory includes instructions for a transmission power control operation of the processor, wherein the instructions include an algorithm in which the processor controls a transmission power of the first antenna in case that the first grip sensor detects an approach signal of the external dielectric body, and wherein even when the first grip sensor is unable to detect the proximity information of the external dielectric body, the processor is further configured to control the transmission power of the first antenna when the approach signal of the external dielectric body is transferred from the second grip sensor and the third grip sensor to the processor.

3. The electronic device of claim 1, wherein even when the proximity information is not received from the first grip sensor, the processor is further configured to determine that the external dielectric body is in proximity to the first grip sensor when the proximity information is received from the second grip sensor and the third grip sensor.

4. The electronic device of claim 1, wherein when it is determined that the external dielectric body is in proximity to the first grip sensor, the processor is further configured to reduce a transmission power of the first antenna based on the determination that the external dielectric body is in proximity to the first grip sensor.

5. The electronic device of claim 4, further comprising:
a communication processor,
wherein when it is determined that the external dielectric body is in proximity to the first grip sensor, the processor is further configured to transmit a control signal for instructing the communication processor to reduce the transmission power of the first antenna, and
wherein the communication processor is configured to reduce the transmission power of the first antenna.

6. The electronic device of claim 1,
wherein the first frequency band of the first antenna belongs to 2.5 gigahertz (GHz) to 2.7 GHz,
wherein the second frequency band of the second antenna belongs to 600 MHz to 2.4 GHz, and
wherein the third frequency band of the third antenna belongs to 1.5 GHz to 2.4 GHz.

7. The electronic device of claim 1, wherein the first antenna, the second antenna, and the third antenna have at least one form of a planar inverted F antenna (PIFA), a semi-PIFA, or a mono pole antenna.

8. The electronic device of claim 1, wherein the second antenna and the third antenna have a longer length than a length of the first antenna.

9. The electronic device of claim 1, wherein the second grip sensor and the third grip sensor have a longer proximity recognition distance than a proximity recognition distance of the first grip sensor.

10. The electronic device of claim 1, wherein the first grip sensor, the second grip sensor, and the third grip sensor are further configured to:
detect an amount of capacitance change in real time when a power of the electronic device is turned on; and
transfer the proximity information of the external dielectric body to the processor in case that the amount of capacitance change exceeds a predetermined reference value.

11. The electronic device of claim 10,
wherein the processor is further configured to use a plurality of grip sensors including the first grip sensor, the second grip sensor, and the third grip sensor in determining the proximity of the external dielectric body, and
wherein the plurality of grip sensors individually have the predetermined reference value.

12. A method for controlling a transmission power of an electronic device which includes:
a first antenna configured to transmit and receive a first radio frequency (RF) signal of a first frequency band;
a second antenna disposed spaced apart from the first antenna in a first direction, and configured to transmit and receive a second RF signal of a second frequency band that is lower than the first frequency band;
a third antenna disposed spaced apart from the first antenna in a second direction that is opposite to the first direction, and configured to transmit and receive a third RF signal of a third frequency band that is lower than the second frequency band;
a first grip sensor configured to detect proximity of an external dielectric body based on a capacitance change of the first antenna;
a second grip sensor configured to detect proximity of the external dielectric body based on a capacitance change of the second antenna; and
a third grip sensor configured to detect proximity of the external dielectric body based on a capacitance change of the third antenna,
wherein the method comprises:
determining the proximity of the external dielectric body using the first grip sensor, the second grip sensor, and the third grip sensor, and
controlling a transmission power of the electronic device based on the proximity of the external dielectric body, and
wherein determining the proximity of the external dielectric body includes determining that the external dielectric body is in proximity to the first grip sensor when receiving proximity information from the second grip sensor and the third grip sensor.

13. The method of claim 12,
wherein the electronic device further comprises a processor operatively connected to the first grip sensor, the second grip sensor, and the third grip sensor,
wherein controlling the transmission power of the electronic device is performed by the processor, and
wherein if it is determined that the external dielectric body is in proximity to the first grip sensor, the processor is configured to reduce a transmission power of the first antenna based on the determination.

14. The method of claim 13,
wherein the electronic device further comprises a memory,
wherein the memory includes instructions for a transmission power control operation of the processor,
wherein the instructions include an algorithm in which the processor controls a transmission power of the first antenna in case that the first grip sensor detects an approach signal of the external dielectric body, and
wherein even when the first grip sensor is unable to detect the proximity information of the external dielectric body, the processor is further configured to control the transmission power of the first antenna when the approach signal of the external dielectric body is transferred from the second grip sensor and the third grip sensor to the processor.

15. The method of claim 14,
wherein the electronic device further comprises a communication processor,
wherein if it is determined that the external dielectric body is in proximity to the first grip sensor, the processor is configured to transmit a control signal for instructing the communication processor to reduce the transmission power of the first antenna, and wherein the communication processor is configured to reduce the transmission power of the first antenna.

16. The method of claim 13, wherein the first grip sensor, the second grip sensor, and the third grip sensor are further configured to:

detect an amount of capacitance change in real time when a power of the electronic device is turned on;

transfer the proximity information of the external dielectric body to the processor in case that the amount of capacitance change exceeds a predetermined reference value; and individually determine the predetermined reference value in accordance with the first grip sensor, the second grip sensor, and the third grip sensor, respectively.

17. The method of claim 12,
wherein the first frequency band of the first antenna belongs to 2.5 gigahertz (GHz) to 2.7 GHz,
wherein the second frequency band of the second antenna belongs to 600 MHz to 2.4 GHz, and
wherein the third frequency band of the third antenna belongs to 1.5 GHz to 2.4 GHz.

18. The method of claim 12, wherein the first antenna, the second antenna, and the third antenna have at least one form of a planar inverted F antenna (PIFA), a semi-PIFA, or a mono pole antenna.

19. The method of claim 12, wherein the second antenna and the third antenna have a longer length than a length of the first antenna.

20. The method of claim 12, wherein the second grip sensor and the third grip sensor have a longer proximity recognition distance than a proximity recognition distance of the first grip sensor.

* * * * *